(12) United States Patent
Turner

(10) Patent No.: US 9,172,664 B2
(45) Date of Patent: *Oct. 27, 2015

(54) SYSTEM AND METHOD FOR ENHANCING DIGITAL CONTENT

(71) Applicant: LiveChime, Inc., Kenmore, WA (US)

(72) Inventor: Tod C. Turner, Kenmore, WA (US)

(73) Assignee: SRI INTERNATIONAL, Menlo Park, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 13/631,056

(22) Filed: Sep. 28, 2012

(65) Prior Publication Data

US 2013/0144962 A1    Jun. 6, 2013

Related U.S. Application Data

(63) Continuation of application No. 12/611,557, filed on Nov. 3, 2009, now Pat. No. 8,346,877.

(60) Provisional application No. 61/222,756, filed on Jul. 2, 2009, provisional application No. 61/198,148, filed on Nov. 3, 2008.

(51) Int. Cl.
| | |
|---|---|
| *G06F 15/16* | (2006.01) |
| *H04L 12/58* | (2006.01) |
| *G06Q 10/10* | (2012.01) |
| *H04L 29/06* | (2006.01) |
| *H04L 12/18* | (2006.01) |

(52) U.S. Cl.
CPC ............. *H04L 51/04* (2013.01); *G06F 15/16* (2013.01); *G06Q 10/10* (2013.01); *G06Q 10/107* (2013.01); *H04L 12/1818* (2013.01); *H04L 65/4007* (2013.01)

(58) Field of Classification Search
USPC ......... 709/201, 202, 203, 204, 205, 206, 227, 709/228, 229, 238
See application file for complete search history.

(56) References Cited

U.S. PATENT DOCUMENTS

| | | | |
|---|---|---|---|
| 7,848,971 B1 * | 12/2010 | Mori et al. .................. | 705/31 |
| 2001/0056370 A1 | 12/2001 | Tafla | |
| 2004/0172358 A1 * | 9/2004 | Lent et al. .................. | 705/38 |
| 2005/0050164 A1 * | 3/2005 | Burd et al. .................. | 709/217 |
| 2006/0116924 A1 | 6/2006 | Angles et al. | |
| 2007/0203982 A1 * | 8/2007 | Jagoe et al. ................. | 709/204 |
| 2007/0245249 A1 * | 10/2007 | Weisberg .................... | 715/758 |
| 2008/0132215 A1 | 6/2008 | Soderstrom et al. | |
| 2008/0242284 A1 | 10/2008 | Vechey et al. | |
| 2008/0282290 A1 * | 11/2008 | Malik et al. ................. | 725/42 |

* cited by examiner

*Primary Examiner* — Saket K Daftuar
(74) *Attorney, Agent, or Firm* — Barnes & Thornburg LLP; Thomas J. McWilliams; Edward F. Behm, Jr.

(57) ABSTRACT

A computer-readable medium including computer-executable code for enhancing an electronic document with one link and being served via a network responsively to a request received via the network and correspondent to an electronic document. The chat application may be for use with a mobile device and be less computing resource intensive. Certain embodiments of the present invention may not require a code or applets to be inserted to provide chat functionality. Advantageously, only a link may need to be inserted, for example. This may provide particularly well suited for use with websites where traditional chat code or applets may not be inserted.

20 Claims, 19 Drawing Sheets

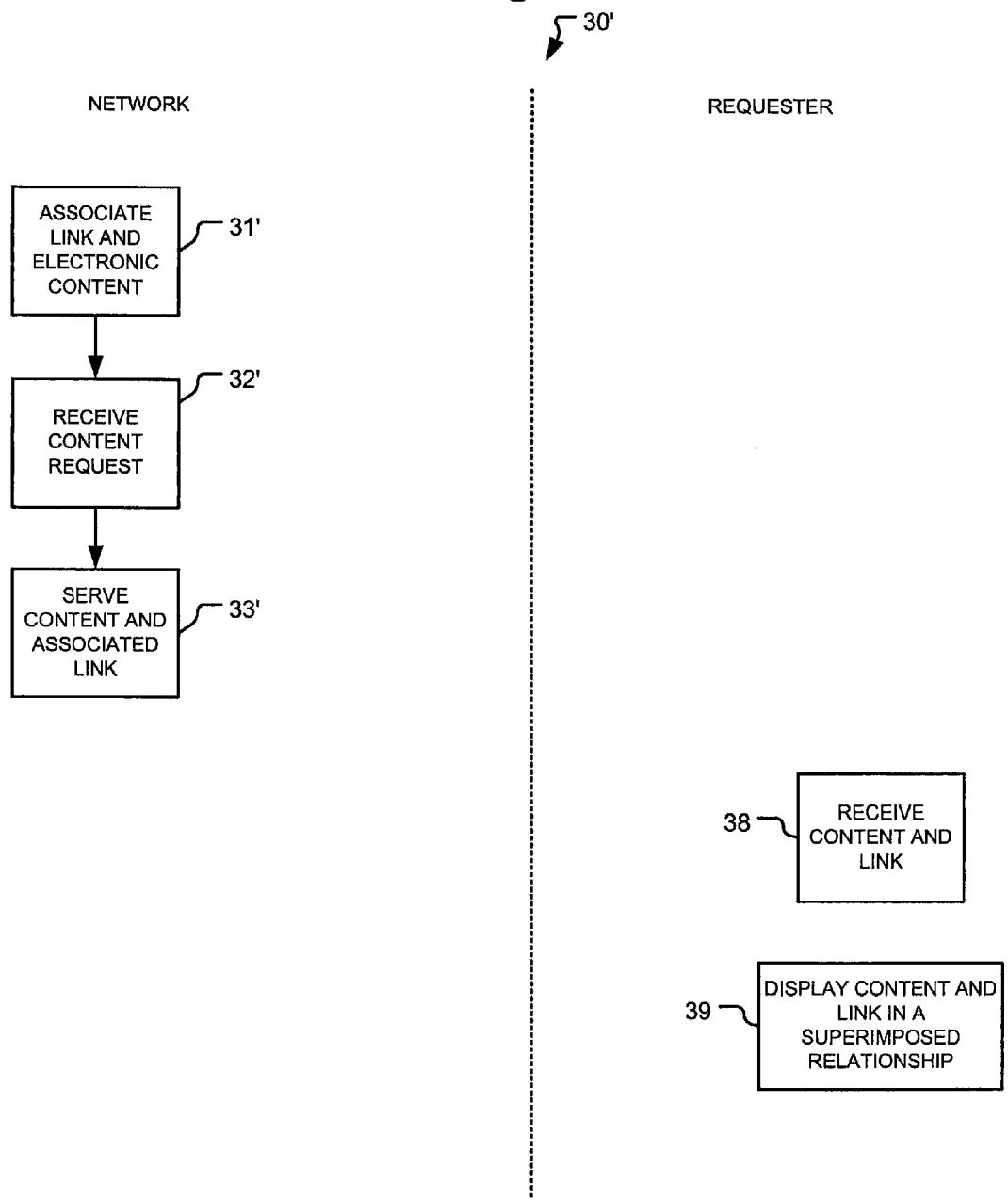

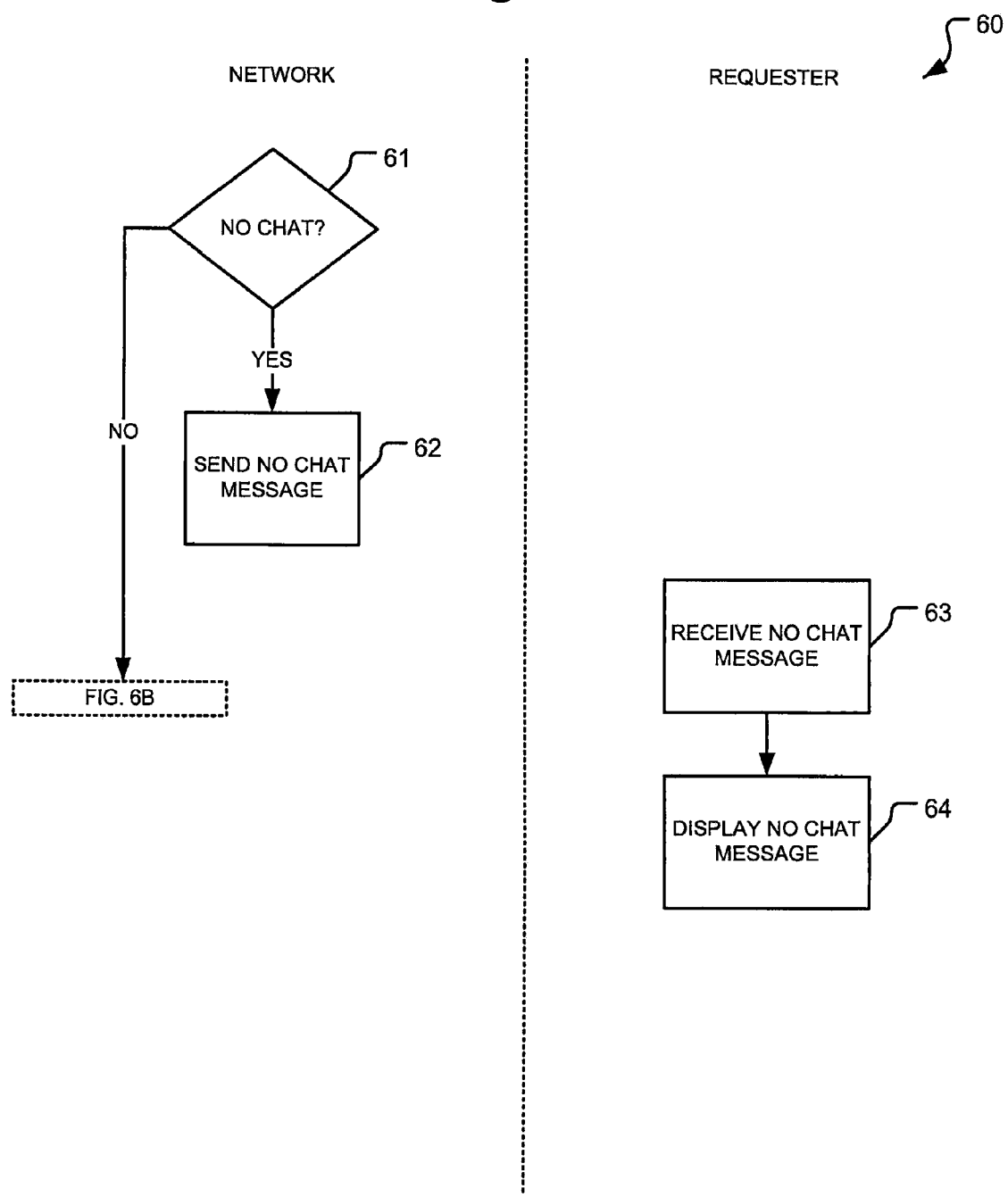

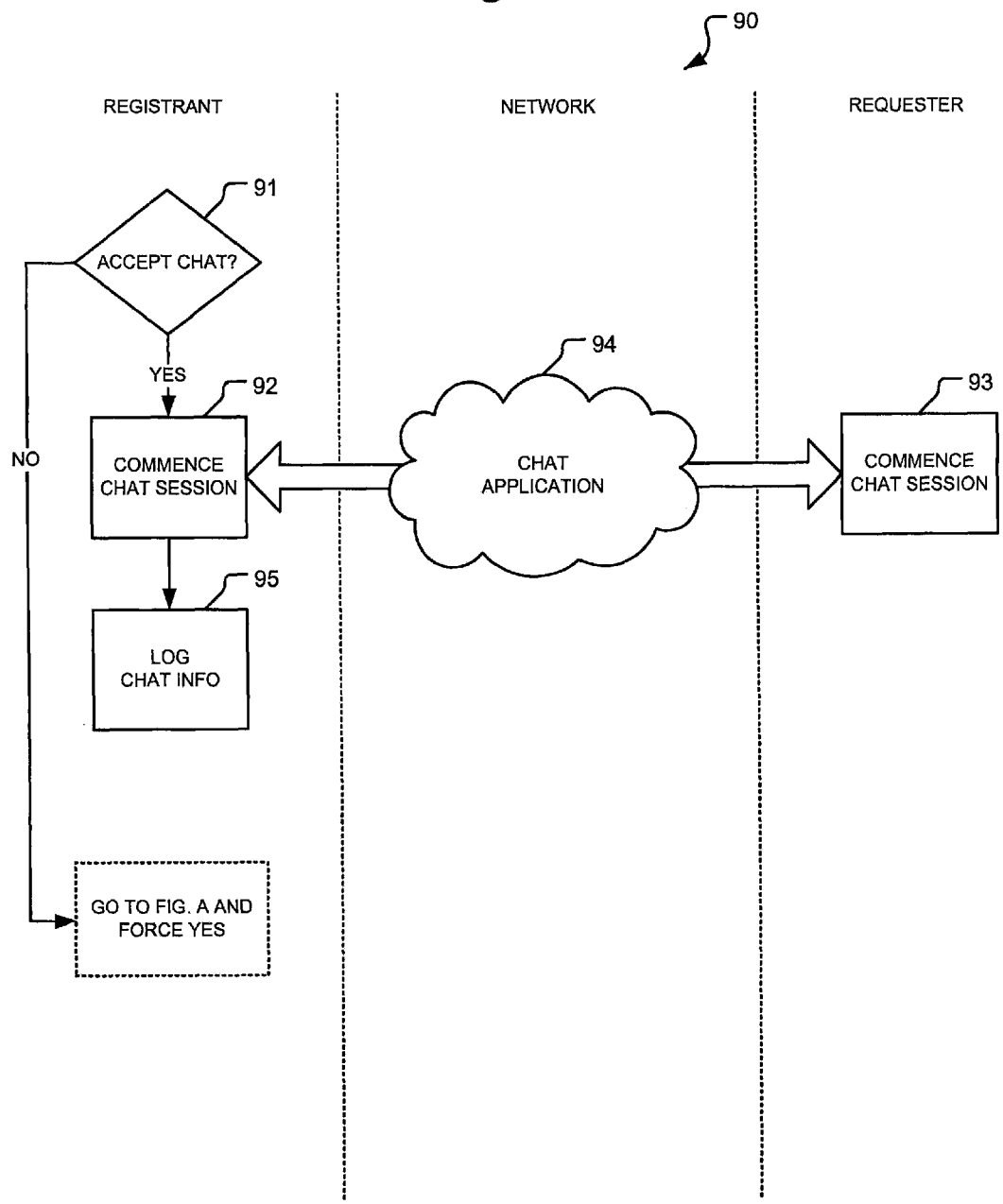

SYSTEM AND METHOD FOR ENHANCING DIGITAL CONTENT

This application is a continuation of U.S. patent application Ser. No. 12/611,557, entitled "System and Method for Enhancing Digital Content," filed Nov. 3, 2009; which claims benefits of priority to U.S. Prov. Patent Nos. 61/198,148, entitled "System and Method for Attaching a Real Time Virtual Presence", filed Nov. 3, 2008; and 61/222,756, entitled: "System and Method for Enhancing Digital Content", filed Jul. 2, 2009; wherein all of the aforementioned priority applications are hereby incorporated by reference in their entirety and for all purposes.

FIELD OF THE INVENTION

The present invention generally relates to digital content delivery and computerized chat systems and methods.

BACKGROUND OF THE INVENTION

Computerized chat services (referred to herein as "chat services") provide for real-time or substantially real-time communications between a plurality of users via computing devices. Chat services generally provide a relatively anonymous, non-threatening way for parties, such as prospective agents, brokers, buyers and/or sellers, to communicate. A "chat" application, as used herein, generally refers to computing device executable code being tangibly embodied on a computing device—readable media, such as a memory, which provides for real-time or substantially real-time communications between a plurality of registrants via computing devices (i.e., chat services). Once a chat has been initiated, a chat user can typically communicate text to another communicating chat user by entering it into their computing device, such as by typing on a keyboard. The entered text will typically appear on the other chat user's computing device display.

While the present invention is not limited to electronic commerce channels, it is believed sell-through via electronic commerce channels, e.g., websites, can be enhanced using chat services. Indeed, some have indicated that self-through on web sites may be increased by 500% if chat services are offered via product web pages. It is thus believed that chat services can fill a necessary void in online sales, allowing buyers to communicate substantially anonymously, such as with prospective agents, brokers or sellers, without fear of sales pressure.

Further, electronic commerce channels for amateur and/or sellers having relatively limited computing and/or financial resources are expanding. For example, online classifieds, such as those commercially available via www.ebay.com and www.craigslist.com are generally finding greater acceptance and use among sellers and prospective buyers. Other expanding electronic commerce markets may include the automobile and real estate markets, and service provider markets, such as for insurance services, for example.

Due to the nature of e-commerce channels (e.g., 24/7/365 availability) offering conventional chat services for use with e-commerce channels may typically require one or more seller persons to continuously monitor for chat requests by interacting with a personal computer. Amateur and/or sellers having relatively limited computing and/or financial resources may typically not be able/willing to provide such coverage. Further, conventional chat services may typically require chat application code, such as JAVA code corresponding to the chat application, to be inserted into a web page. Where a listing web page is operated by a third party that does not allow for chat application code insertion, conventional chat applications may not be suitable for use. Conventional chat services may thus be relatively ill-suited for certain uses.

SUMMARY OF THE INVENTION

In certain embodiments of the present invention, a computer program product being embodied in a computer-readable medium and including computer-executable code for enhancing an electronic document including at least one link and being served via a network responsively to a request received via the network and correspondent to the electronic document may be provided.

The computer program product computer-executable code may include code for receiving a chat request via the network corresponding to activation of the at least one link included in the electronic document.

The computer program product computer-executable code may include code for automatically identifying an identifier responsively to the received chat request.

The computer program product computer-executable code may include code for automatically identifying at least one preference associated with the identified identifier.

The computer program product computer-executable code may include code for automatically sending an SMS message including a mobile chat link indicative of the received chat request in a first mode, wherein the first mode corresponds to the at least one identified preference indicating an SMS messaging preference.

The computer program product computer-executable code may include code for automatically sending an e-mail message including a personal computer chat link indicative of the received chat request in a second mode, wherein the second mode corresponds to the at least one identified preference indicating an e-mail messaging preference.

The computer program product computer-executable code may include code for automatically sending both. SMS and e-mail messages, the SMS message including the mobile chat link and the e-mail message including the personal computer chat link, each of the mobile chat and personal computer chat links being indicative of the received chat request, in a third mode, wherein the third mode corresponds to the at least one identified preference indicating both SMS and e-mail messaging preferences.

The computer program product computer-executable code may include code for selectively automatically causing a mobile mode of a chat application corresponding to the received chat request to be instantiated responsively to receiving a request via the network correspondent to activation of the mobile mode link.

The computer program product computer-executable code may include code for selectively automatically causing a personal computer mode of the chat application corresponding to the received chat request to be instantiated responsively to receiving a request via the network correspondent to activation of the personal computer mode link.

The mobile mode instantiation of the chat application may be adapted for use with a mobile device and be less computing resource intensive than the personal computer mode instantiation of the chat application, which may be adapted for use with a personal computer.

The electronic document may include a plurality of content portions, and the link may correspond to at least one of the content portions.

The computer program product may further include code for identifying an identifier associated with the at least one of the content portions of the electronic document responsively to the correspondent request for or serving of the electronic document.

The computer program product may further include code for serving the identified identifier contemporaneously with the electronic document, wherein the served identifier forms at least a part of the at least one link.

The instantiated chat application may be displayed with the electronic document such that the chat application visually corresponds with the at least one content portion of the served electronic document.

The computer program product may further include code for causing the served electronic document to be framed responsively to receiving the request correspondent to activation of the mobile chat mode or personal computer mode link.

The electronic document may be displayed in a first window, and the chat application be instantiated in a second window. The electronic document may be displayed in a same window in which the chat application is instantiated.

The computer program product may further include code for selectively updating the instantiated chat application irrespective of the electronic document.

The chat request may include a uniform resource locator having an identifier appended thereto.

Certain embodiments of the present invention may not require a code or applets to be inserted into or otherwise incorporated into a website to provide chat functionality. Advantageously, only a link may need to be inserted, for example. This may provide particularly well suited for use with websites where traditional chat code or applets may not be inserted.

In certain embodiments of the present invention, a computer program product being tangibly embodied in a computer-readable medium and including computer-executable code for enhancing an electronic document including at least one advertisement portion and at least one other advertising or content portion may be provided. The at least one advertisement portion may be automatically selected for dynamic incorporation into the at least one electronic document when served via a network substantially contemporaneously with the electronic document responsively to a request received via the network from a user's computing device and being correspondent to the electronic document.

The computer program product computer-executable code may include code for identifying an identifier associated with the at least one advertisement portion of the electronic document responsively to the correspondent request for or serving of the electronic document.

The computer program product computer-executable code may include code for serving the identified identifier contemporaneously with the electronic document and separate from the advertisement portion, wherein the served identifier forms at least a part of a link incorporated with the electronic document when the served electronic document is displayed.

The computer program product computer-executable code may include code for causing a chat application to be instantiated responsively to and dependently upon receiving a second request via the network and corresponding to the served electronic document incorporated link.

The instantiated chat application is displayed via the user's computing device without a client chat application being executed by the user's computing device.

The instantiated chat application may be displayed with the electronic document such that the chat application is superimposed with substantially only the at least one advertisement portion of the served electronic document.

The computer program product computer-executable code may include code for causing the served electronic document to be framed responsively to receiving the second request.

The electronic document may be displayed in a first window, and the chat application may be instantiated in a second window.

The electronic document may be displayed in a same window in which the chat application is instantiated.

The computer program product computer-executable code may include code for selectively updating the chat application irrespective of the electronic document.

The computer program product computer-executable code may include code for updating the identifier associated at least one of the content portions of the electronic document irrespective of at least one other content portion of the electronic document.

The second request may include a uniform resource locator having the identifier appended thereto. The identifier includes a GUID.

The link and the second request may include a same alphabetic, numeric or alphanumeric string appended to a uniform resource locator.

The instantiated chat application may be displayed separate from the electronic document.

The computer program product computer-executable code may include code for sending a second link responsively to and dependently upon receiving a second request via the network and corresponding to the served electronic document incorporated link.

The computer program product computer-executable code may include code for sending a plurality of second links responsively to and dependently upon receiving the second request via the network and corresponding to the served electronic document incorporated link.

Each of the second links may correspond to a different type of computing device having an associated processing capability.

A type of chat application instantiated dependently upon the second request may correspond to which of the second links was activated.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts, and in which:

FIG. 3B illustrates a block diagrammatic representation of a process according to an embodiment of the present invention;

FIG. 6A illustrates a block diagrammatic representation of a process according to an embodiment of the present invention;

FIG. 7 illustrates a block diagrammatic representation of a process according to an embodiment of the present invention;

FIG. 8D illustrates an electronic document and chat instantiation according to an embodiment of the present invention.

DETAILED DESCRIPTION OF THE PREFERRED EMBODIMENTS OF THE INVENTION

It is to be understood the figures and descriptions of the present invention have been simplified to illustrate elements that are relevant for understanding the present invention, while eliminating, for purposes of clarity, many other elements found in typical computing, networking and chat applications, systems and methods. Because such elements are well known in the art, and because they do not facilitate a better understanding of the present invention, a discussion of such elements is not provided herein.

Figure 1B:
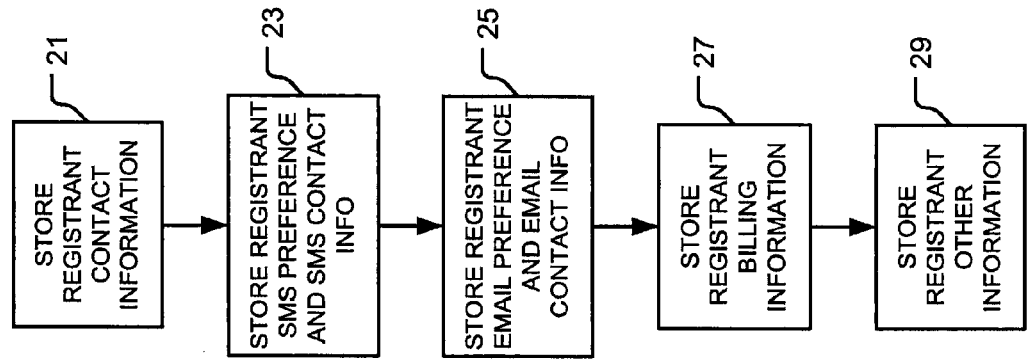
FIG. 1B illustrates a block diagrammatic representation of a process according to an embodiment of the present invention.
Figure 1A:
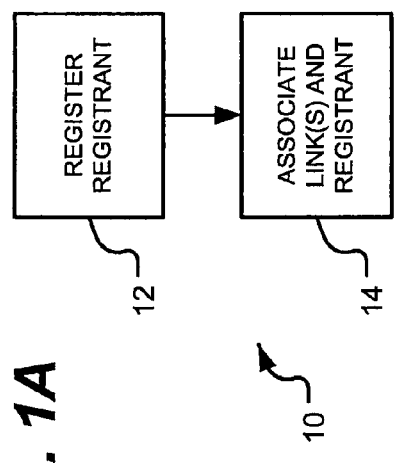
FIG. 1A illustrates a block diagrammatic representation of a process according to an embodiment of the present invention.

Referring now to FIG. 1A, there is shown a block diagrammatic representation of a process 10 according to an embodiment of the present invention. Process 10 generally includes registering a user or customer at block 12 and associating one or more chat service links with the registered customer at block 14. Such a customer or user will be referred to herein as a "link registrant" or "registrant" for non-limiting purposes of explanation. Processing at block 12 may take the form of a user registration process conventionally utilized by users of computing devices in association with Internet websites, for example. Processing at block 14 many include storing information items associated with registrants in one or more databases, for example.

By way of non-limiting explanation, "computing device", as used herein, refers to a general purpose computing device that includes a processor. A processor generally includes a Central Processing Unit (CPU), such as a microprocessor. A CPU generally includes an arithmetic logic unit (ALU), which performs arithmetic and logical operations, and a control unit, which extracts instructions (e.g., code) from a computer readable medium, such as a memory, and decodes and executes them, calling on the ALU when necessary. "Memory", as used herein, generally refers to one or more devices or media capable of storing data, such as in the form of chips or drives. For example, memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including the processor. Memory may take the form of magnetic or optical—technology based storage media. Memory may be internal or external to a computing device. Memory may store a computer program, e.g., code or a sequence of instructions being operable by the processor. In certain embodiments of the present invention, one or more of the elements provided may take the form of code being executed using one or more computing devices, such as in the form of computer device executable programs or applications being stored in memory. There are various types of computing devices, having varying processing and memory capabilities, such as: personal computers (like those that are commercially available from Dell and Apple Corp.), and personal digital assistants and smart phones (like those that are commercially available from Apple Corp. and Research in Motion), by way of non-limiting example only.

"Website", as used herein, generally refers to a collection of one or more electronic documents (e.g., webpages) that are available via a computer network, such as the global interconnection of computers and computer networks commonly referred to as the Internet. By way of non-limiting example, a website may be accessed at a given address on the World Wide Web (i.e., "www.URL.TLD"), and include a home page, which is the first webpage visitors typically see when they enter the site. A website may also contain additional webpages. Webpages may be fixed, and/or dynamically generated in response to website visitor webpage requests. By way of further non-limiting example only, the World Wide Web is a system of Internet servers that support HTML (Hypertext Markup Language), such that a website visitor can jump from one webpage to another webpage simply by clicking on references to other webpages, such as hot spots or hot links (referred to herein as "links"). Web browsing applications, such as Microsoft's Internet Explorer and Google's Chrome, are available applications used to access websites on the World Wide Web. Other computer network types and/or protocols and/or mark up languages and/or applications may be used. Webpages are typically served by servers.

A "server", as used herein, is generally communicatively coupled to a network, and manages network resources. A server may refer to a discrete computing device, or may refer to an application that is managing resources rather than an entire computing device. "Network", as used herein, generally refers to a group of two or more computing devices communicatively connected to one-another. "Internet", as used herein, generally refers to the global interconnection of computing devices, and computing device networks, commonly referred to as such.

Referring now to FIG. 1B, there is shown a block diagrammatic representation of a process 20 according to an embodiment of the present invention. According to certain embodiments of the present invention, process 20 is suitable for use at block 12 for registering a registrant. Process 20 may be utilized in combination with a database, such as the database referenced with regard to FIG. 1A.

Process 20 generally includes storing registrant contact information at block 21. Information stored at block 21 may include name, address, e-mail address, phone number and/or business type, all by way of non-limiting example.

Process 20 generally includes storing registrant preference information at block 23. In the illustrated embodiment of FIG. 1B, the preference information stored at block 23 is reflective of the registrant's preferences and contact information regarding short messaging service (SMS) messages. Information stored at block 23 may include an indication of whether the registrant wishes to receive SMS notifications of chat requests and SMS contact information for the registrant, both by way of non-limiting example. Such SMS contact information may be authenticated by sending an SMS message to the entered SMS contact address, and requiring the registrant to return and/or reply to the message.

Process 20 generally includes storing registrant preference information at block 25. In the illustrated embodiment of FIG. 1B, the preference information stored at block 25 is reflective of the registrant's preferences and contact information regarding e-mail messaging. Information stored at block 25 may include an indication of whether the user wishes to receive e-mail notifications of chat requests and e-mail contact information for the registrant, both by way of non-limiting example. Such email contact information may be authenticated by sending an email message to the entered e-mail contact address, and requiring the registrant to return and/or reply to the message.

Process 20 generally includes storing registrant information at block 27. In the illustrated embodiment of FIG. 1B, information stored at block 27 is reflective of the registrant's billing information. Information stored at block 27 may include credit card or other payment information, by way of non-limiting example.

Process 20 generally includes storing registrant information at block 29. In the illustrated embodiment of FIG. 1B, information stored at block 29 may be reflective of business, product or other registrant information, for example.

In certain embodiments of the present invention, information stored via process 20 may be stored in one or more databases, for example. Other types of information may be stored in addition to or lieu of those types discussed herein.

Figure 2A:
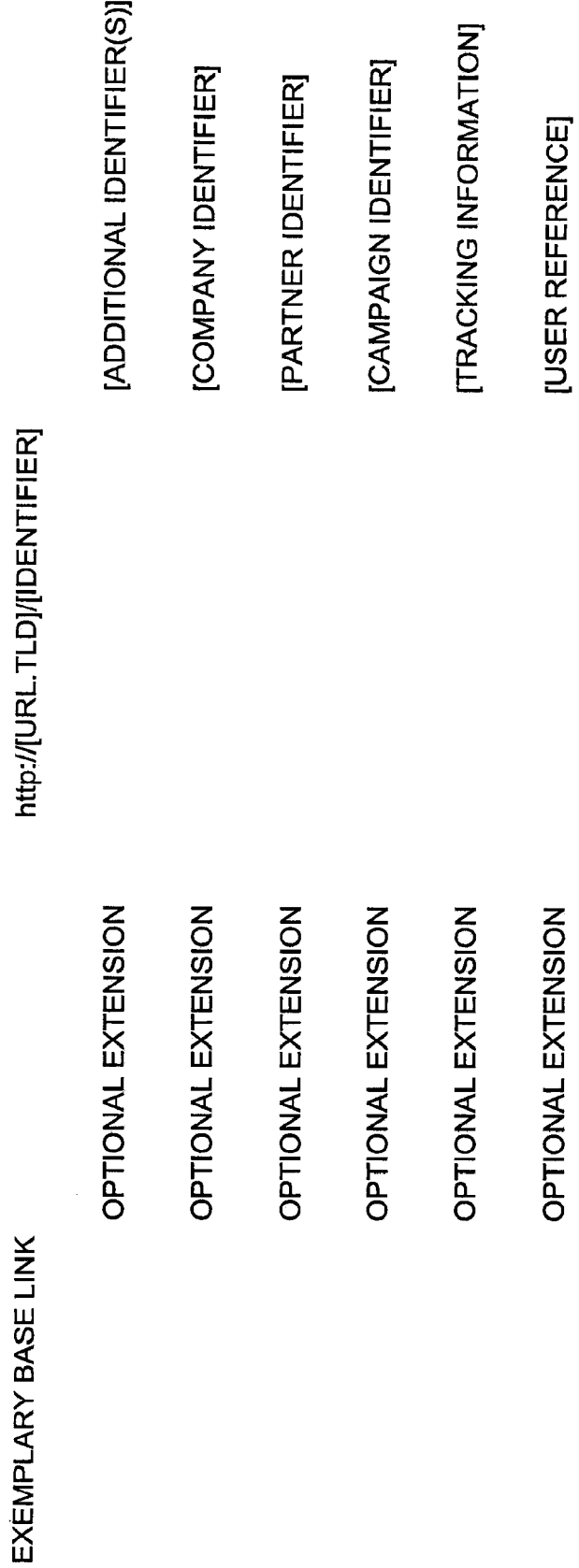
FIGS. 2A AND 2B illustrates link formats according to embodiments of the present invention.

Referring now to FIG. 2A, there are shown link formats according to embodiments of the present invention. According to certain embodiments of the present invention, a link format utilized may take the form of a uniform resource locator (URL) link. Utilized links may include a base link portion. An exemplary base link portion may take the form of HTTP://[URL.TLD]/[IDENTIFIER] or HTTP://CHAT.[URL.TLD]/[IDENTIFIER], by way of non-limiting example, where URL.TLD takes the form of a conventional Internet uniform resource locator and top level domain name, and IDENTIFIER takes the form of any applicable protocol supported identification, such as an alphabetic, alphanumeric, symbolic or numeric identifier associated with the link registrant, for example. An exemplary URL.TLD may take the form of LIVECHIME.COM, for example. An exemplary IDENTIFIER may take the form of ABC123, for example. An exemplary base link portion may take the form of HTTP://LIVECHIME.COM/ABC123 or HTTP://CHAT.LIVECHIME.COM/ABC123, for example. Such base link portions may be used by themselves as links, or be supplemented with one or more extension portions.

Referring still to FIG. 2A, a link format utilized may additionally include one or more extension portions. In the illustrated case of FIG. 2A, extension(s) utilized may include one or more additional identifiers, such as a user or company identifier, a partner identifier, and/or a campaign identifier. Other extensions utilized may reflect other information, such as tracking information and/or a registrant reference, for example. In certain embodiments of the present invention, one or more extension portions may be contiguously appended to the base link portion. By way of non-limiting example, utilized links may take the form of http://livechime.com/ABC123/IDENTIFIER1 or http://livechime.com/ABC123/IDENTIFIER1/IDENTIFIER2.

Referring still to FIGS. 1A and 2A, in certain embodiments of the present invention, links may be associated with registrants at block 14 (FIG. 1) by storing the link, or portions thereof, in one or more databases so as to be associated with corresponding registrants, for example.

In certain embodiments of the present invention, links which are associated with registrants may be provided for use by prospective chat requesters, or requesters for non-limiting purposes of explanation. For example, links may be incorporated in webpages or e-mails. In certain embodiments of the present invention, registrant associated links may be incorporated in electronic classified advertisements, such as those akin to eBay or Craigslist listings, for example. Additionally, or in lieu thereof, registrant associated links may be further associated with content that is delivered to a webpage viewer, for example. In certain embodiments of the present invention, registrant associated links may be associated with particular portions of a webpage, such as individual listings on an auction or electronic-classified page, as opposed to the entire page.

Figure 2B:
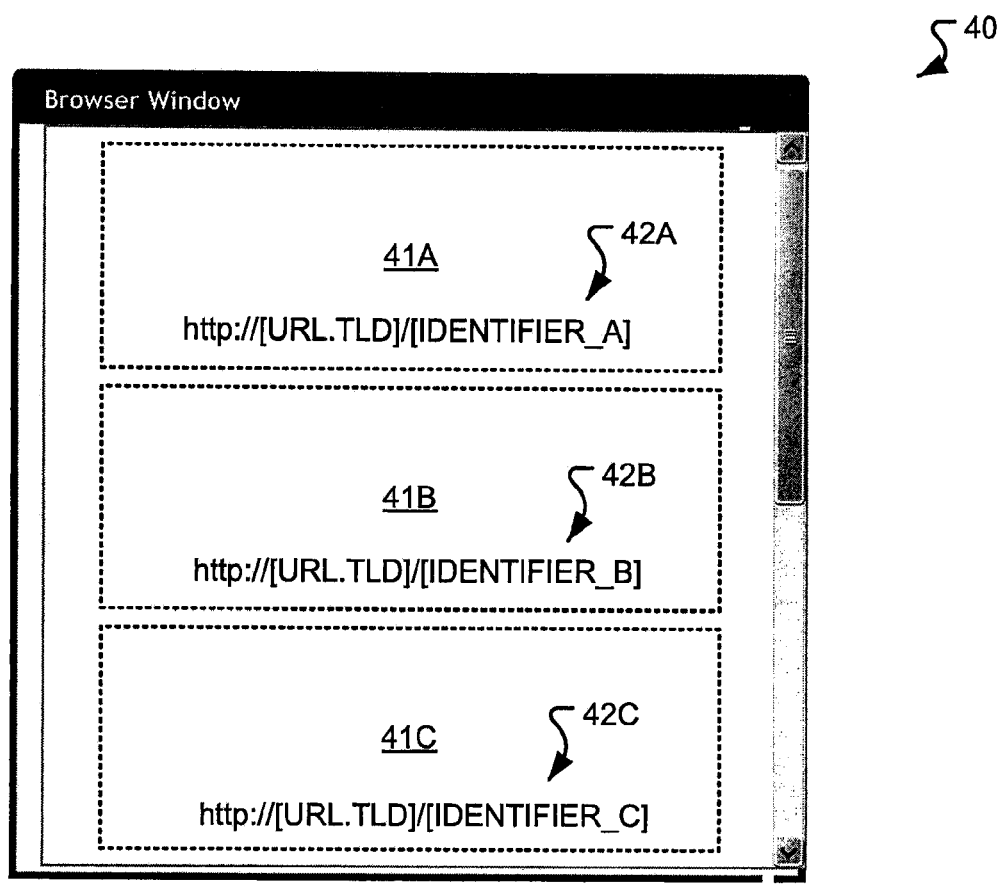

Referring now to FIG. 2B, there is shown an electronic document 40 according to an embodiment of the present invention. In certain embodiments of the present invention, document 40 may take the form of a web page. Document 40 may be static and/or dynamically generated. In certain embodiments of the present invention, document 40 may include one or more web frames or windows. In certain embodiments of the present invention, document 40 may be in a web frame or window. In the illustrated embodiment, document 40 includes content 41A, 41B, 41C and links 42A, 42B, 42C. In certain embodiments of the present invention, links 42A, 42B, 42C may correspond to the links discussed regarding FIG. 2A.

Figure 3A:
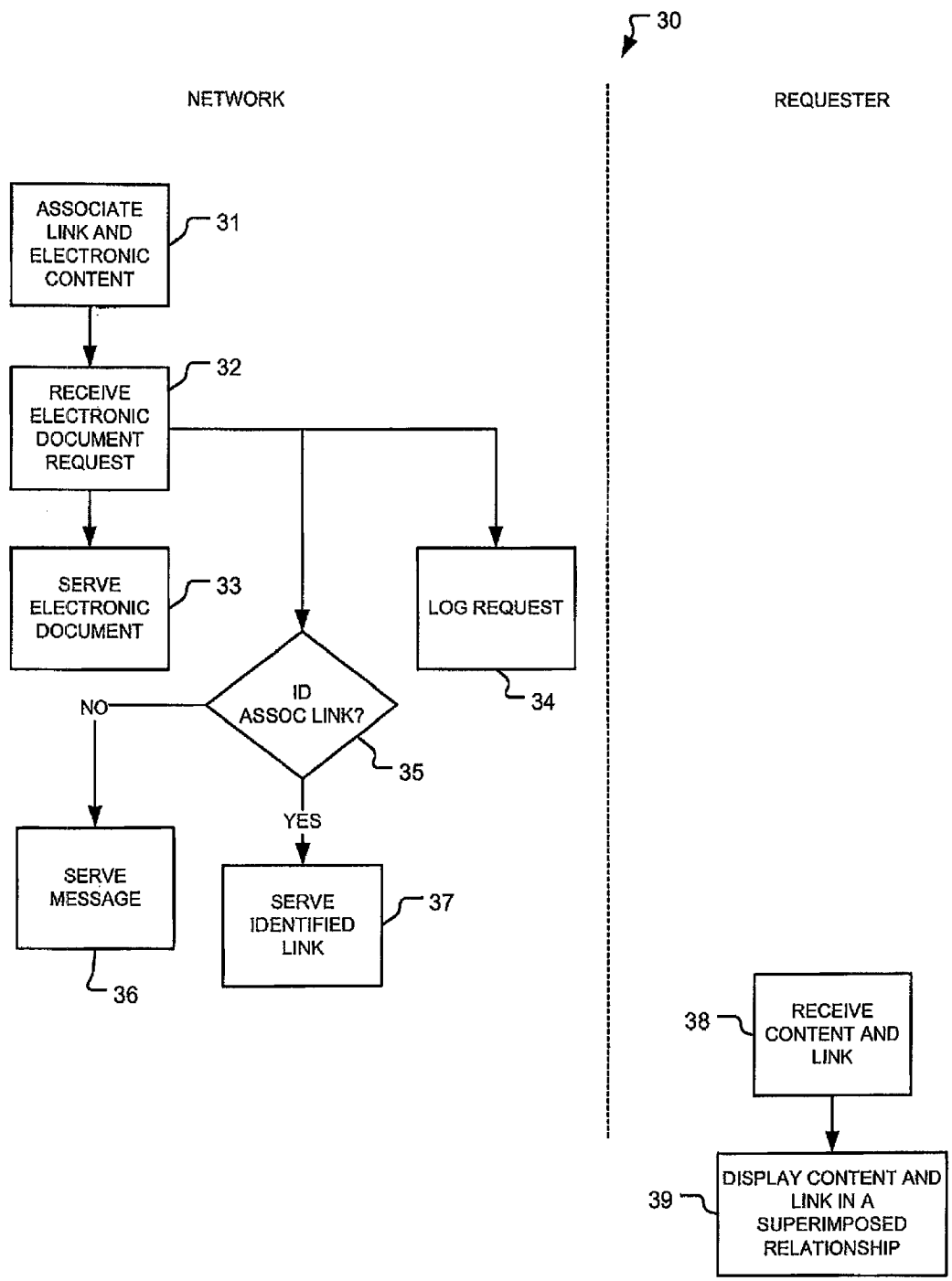
FIG. 3A illustrates a block diagrammatic representation of a process according to an embodiment of the present invention.

Referring now to FIG. 3A, there is shown a block diagrammatic representation of a process 30 according to an embodiment of the present invention. In certain embodiments of the present invention, links may be associated with an electronic document, such as a webpage or content for inclusion in a webpage, like graphic component(s), textual component(s) and/or video component(s), for example, at block 31. An identifier of certain content may be associated with a link (e.g., FIG. 2) at block 31, such as by being associated in a database, for example.

At block 32, a request for an electronic document and hence content is detected, such as via a received link request, for example. The request may take the form of a webpage request for example. Alternatively, the request may correspond to a content item or component for inclusion in a webpage. Such a webpage may take the form of a webpage advertisement, for example. Such a component may take the form of an advertisement component for inclusion in a webpage.

At block 33, a server, such as that receiving a request at block 32, may serve the requested document and hence content, such as an electronic document or portion thereof, like a webpage, or a component for a webpage. At block 34, the request may be logged, such as in a database.

At block 35, it may be determined whether a valid link is associated with the request detected at block 32 (e.g., associated at block 31). In certain embodiments of the present invention, processing at block 35 may include comparing a request received at block 32 to content that was associated with links at block 31. If such a comparison indicates the requested content was not associated with a link, then a message may be served at block 36. In certain embodiments of the present invention, such as message may indicate no valid link is then associated with the requested content. If such a comparison indicates the requested content was associated with a link, then the associated link may be recovered and served at block 37 to a same entity or address as was served the associated content at block 33.

In certain embodiments of the present invention, the content served at block 33 is received at a prospective chat requester's computing device at block 38. In certain embodiments of the present invention, the requester computing device may have originated the request received at block 32. In certain embodiments of the present invention, the link served at block 37 is received at a requester computing device at block 38. In certain embodiments of the present invention, the requester computing device may have originated the request received at block 32. In certain embodiments of the present invention, the message served at block 36 may be received at a requester computing device. In certain embodiments of the present invention, the requester computing device may have originated the request received at block 32. In certain embodiments of the present invention, the content and link received at block 38 by a requester computing device may be presented thereby, such as in a web browser application. The content and link received at block 38 may be presented at block 39 in a superimposed fashion, such as in a web browser application.

Referring now to FIG. 3B, there is shown a block diagrammatic representation of a process 30' according to an embodiment of the present invention. In certain embodiments of the present invention, links may be associated with an electronic document, such as a webpage or content for inclusion in a webpage, like graphic component(s), textual component(s) and/or video component(s), for example, at block 31'. An identifier of certain content may be associated with a link (e.g., FIG. 2) at block 31', such as by being associated in a database, for example.

At block 32', a request for an electronic document and hence content is detected, such as via a received link request, for example. The request may take the form of a webpage request for example. Alternatively, the request may correspond to a content item or component for inclusion in a webpage. Such a webpage may take the form of a webpage advertisement, for example. Such a component may take the form of an advertisement component for inclusion in a webpage.

At block 33', a server, such as that receiving the request at block 32, may serve the requested document and hence content, such as an electronic document or portion thereof, like a webpage, or a component for a webpage. Processing at block 33' may include serving requested content, such as an image file, and an associated link, e.g., URL. Processing at blocks 38 and 39 is analogous to that described with regard to FIG. 3A.

Figure 4A:
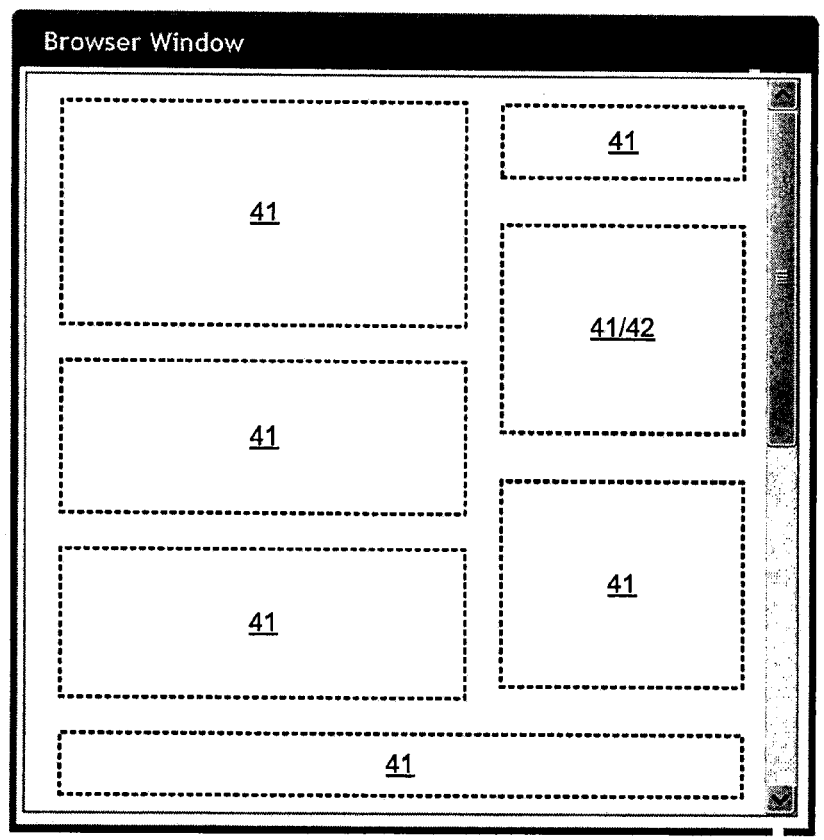
FIG. 4A illustrates an electronic document according to an embodiment of the present invention.
Figure 4B:
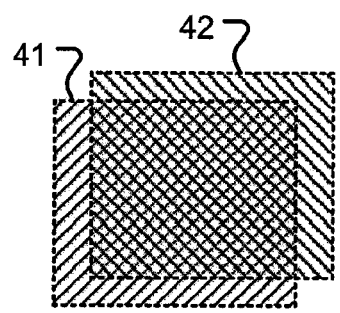
FIG. 4B illustrates a superimposed link and content according to an embodiment of the present invention.

Referring now to FIG. 4A, there is shown an electronic document 40 according to an embodiment of the present invention. In certain embodiments of the present invention, document 40 may take the form of a web page. In certain embodiments of the present invention, document 40 may include one or more web frames or windows. In certain embodiments of the present invention, document 40 may be in a web frame or window. In the illustrated embodiment, document 40 includes content 41. Document 40 may be static and/or dynamically generated. In the illustrated embodiment, document 40 also includes a link 42. In the illustrated embodiment, link 42 is superimposed (e.g., spatially coincident with) substantially only with an element of content 41. Referring now to FIG. 4B, there is shown a non-limiting example of the superimposition of content element 41 and a link 42 demonstrated in FIG. 4A. While the embodiments of FIGS. 4A and 4B illustrate a link 42 and content element 41 having an at least substantially congruous size and shape, either may differ from that of the other. In certain embodiments of the present invention, content 41 and link 42 may take the form of an embedded image (e.g., <img> tagged item) wrapped by an anchor tag, e.g., an <a> tag.

Figure 4C:
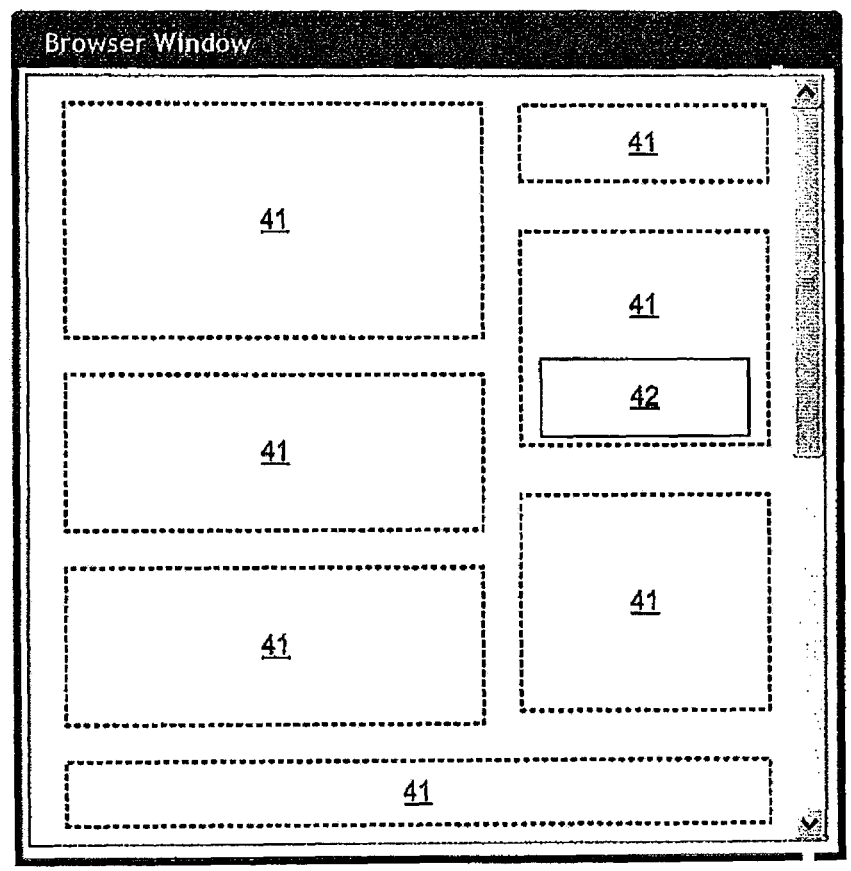
FIG. 4C illustrates an electronic document according to an embodiment of the present invention.
Figure 4D:
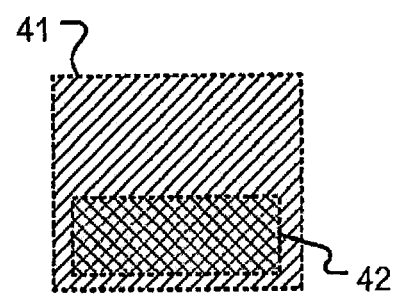
FIG. 4D illustrates a superimposed link and content according to an embodiment of the present invention.

Referring now to FIG. 4C, there is shown an electronic document 40 according to an embodiment of the present invention. In certain embodiments of the present invention, document 40 may take the form of a web page. In certain embodiments of the present invention, document 40 may include one or more web frames or windows. In certain embodiments of the present invention, document 40 may be in a web frame or window. In the illustrated embodiment, document 40 includes content 41. Document 40 may be static and/or dynamically generated. In the illustrated embodiment, document 40 also includes a link 42. In the illustrated embodiment, link 42 is superimposed substantially only with a portion of (e.g., incorporated within the space of) an element of content 41. Referring now to FIG. 4D, there is shown a non-limiting example of the superimposition of content element 41 and a link 42 demonstrated in FIG. 4C. The embodiments of FIGS. 4C and 4D illustrate a link 42 and content element 41 having different shapes and sizes from one another. Again, anchor tagging may be used.

In certain embodiments of the present invention, link activation at a registrant's computing device may selectively trigger a chat initiation with a registrant associated with the activated link. A link may be activated by a requester selecting it, rolling a pointer over it, or upon the launching, loading or displaying of an electronic document that includes it, for example.

As will be understood by those possessing an ordinary skill in the pertinent arts, one or more components of an electronic document, e.g., content 41, may correspond to electronic document "real-estate". An image to be placed in this real-estate, e.g., as content 41, may be pulled from a given storage location when the electronic document is requested, for example. Additionally, a link associated with the content, e.g., 42, may be analogously pulled. Alternatively, the electronic document may itself include code that pulls such an image file and/or link, e.g., URL.

Figure 5:
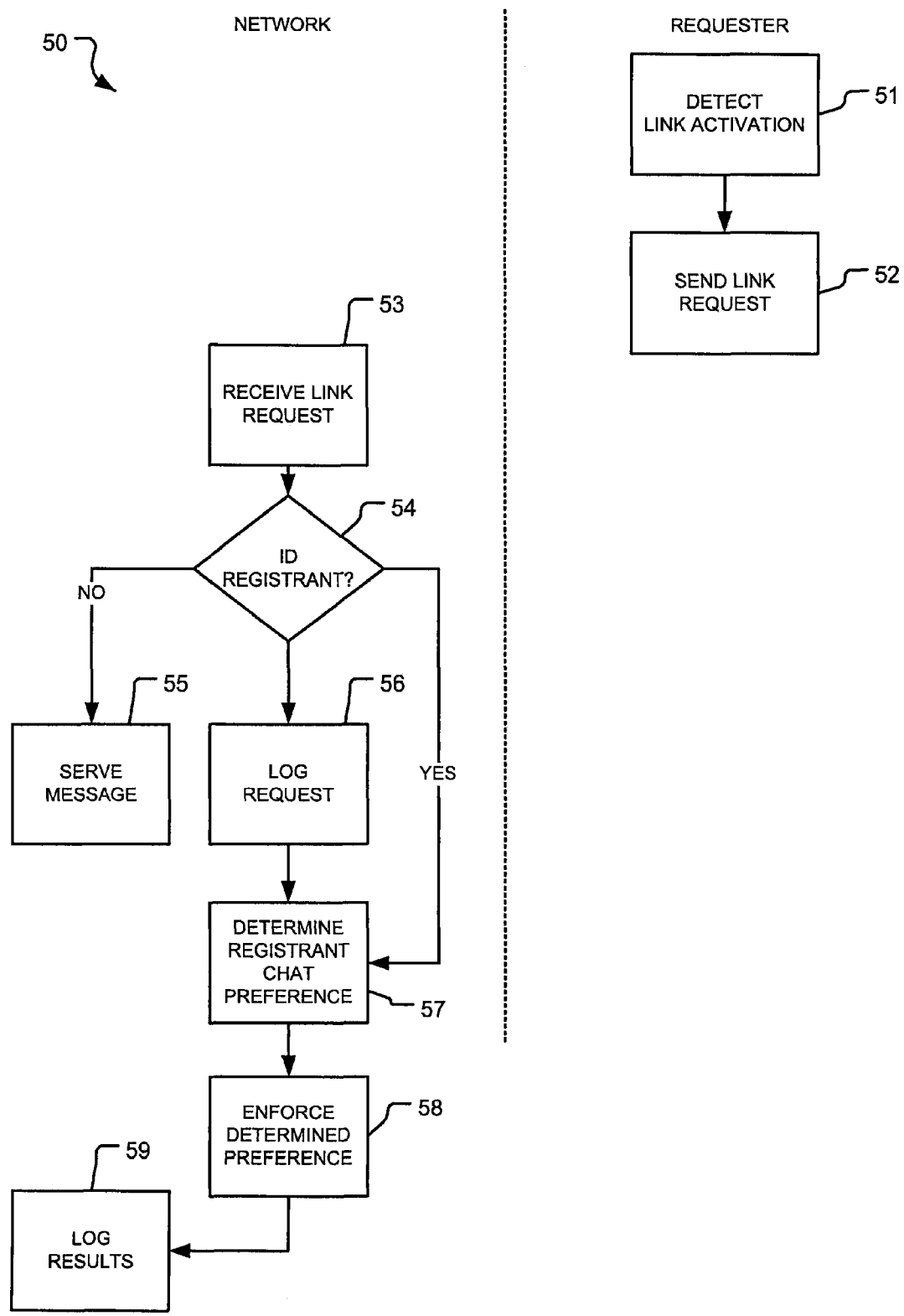
FIG. 5 illustrates a block diagrammatic representation of a process according to an embodiment of the present invention.

Referring now to FIG. 5, there is shown a block diagrammatic representation of a process 50 according to an embodiment of the present invention. In the illustrated embodiment, process 50 includes detecting a link activation at block 51. Processing at block 51 may include detecting a requester activation of a link within a web browsing or other computing device application, such as a link discussed in connection with FIG. 2A. Processing at block 51 may include detecting a requester activation of a link within a browsing or other computing device application, such as a link served at block 37 (FIG. 3). Processing at block 51 may include detecting a requester activation of a link within a browsing or other computing device application, such as a link 42 discussed in connection with FIGS. 4A-4D. At block 52, a message, such as an electronic document (e.g., web page or other page) or content request may be sent by the requester's computing device, responsively to the link activation detection at block 51.

Referring still to FIG. 5, at block 53 a request corresponding to a link is received. The request received at block 53 may correspond to the request sent at block 52. At block 54, it is determined whether a valid registrant is associated with the request received at block 53. Processing at block 54 may include parsing the request received at block 53. Processing at block 54 may include comparing portion(s) of the request received at block 53 to information corresponding to registrant, such as one or more pieces of information entered or stored using process 20 (FIG. 15). Processing at block 54 may include determining whether a link which was activated is active or inactive. Active links may be associated with chat requests that should be allowed to mature into chat sessions, while inactive links may be associated with chat requests that should be denied or rejected. Data flags may be stored in one or more databases to indicate whether an activated link is active or inactive. Link requests and comparison results may be logged at block 56, such as in a database, for example.

In certain embodiments of the present invention, chat request logs may indicate referring web pages or websites from which the received and logged chat requests originate. Such a feature may enable registrants to track or audit how different links, and hence associated advertisements, are performing. For example, a real estate agent may place a listing on three different websites. A same chat link corresponding to the listing may be used in all three listings. Logged chat requests may provide such a real estate agent to readily ascertain how different ones of the listings are performing, relative to one-another, by comparing how many chat requests are originating from each of the web pages, for example. In such a case, cross-website advertisement performance may be more readily available than is conventionally possible, for example.

By way of further, non-limiting example, Table-1 illustrates a chat request log that may be presented in an interactive electronic document, e.g., a web page, according to an embodiment of the present invention. Each row of the illustrated Table-1 is indicative of and associated with a specific chat request. Each row includes an indicator of whether the chat was answered or missed/declines; the date and time of the request, the subject of the request, and an indication of the chat requester, such as a name or e-mail address. Data indicative of that included in Table-1 may be mined from and automatically stored responsively to chat requests in a database, which may be automatically queried to generate Table-1 for a registrant, for example.

TABLE 1

| Answered/ Missed | Date/Time | Subject | From |
| --- | --- | --- | --- |
| ✓ | YYYY/MM/DD HH:MM | Item 1 | Requester 1 |
| x | YYYY/MM/DD HH:MM | Item 2 | Requester 2 |
| ✓ | YYYY/MM/DD HH:MM | Item 1 | Requester 3 |

By way of further, non-limiting example, Table-2 illustrates a chat request log that may be presented in an interactive electronic document, e.g., a web page, according to an embodiment of the present invention. Each row of the illustrated Table-2 is indicative of a different link/link location that is associated with a registrant. Each row includes an indicator of whether chat requests associated with the link are being handled in accordance with global or custom preferences; an indicator of whether action is to be taken when chat requests associated with the link are received; what type of chat request notifications are associated with the link; indications of what electronic document(s) (e.g., website) the link is being used on or with; keywords the link registrant has chosen to indicate the link; and, the number of chat requests, e.g., hits, associated with the link that have been received. Table-2 additionally includes edit and delete items, which can be used to change the preferences or other link settings or delete the link, respectively. Data indicative of that included in Table-2 may be mined from and automatically stored responsively to chat requests in a database, which may be automatically queried to generate Table-2 for a registrant, for example.

TABLE 2

| Custom Setting | Action | Notification | Web Site | Keywords | Hits | | |
| --- | --- | --- | --- | --- | --- | --- | --- |
| x | Active | email | Auction site 1 | Item 1 | 1 | <edit> | <del> |
| x | Active | SMS | Classifieds Site 1 | Item 1 | 1 | <edit> | <del> |
| x | Active | SMS/email | Classifieds Site 2 | Item 2 | 1 | <edit> | <del> |

In certain embodiments of the present invention, multiple rows that are indicative of and associated with a common link may be provided in Table-2. In such a case, each of the common link associated rows may be associated with a different electronic document (e.g., website), which referred the indicated hits. Again, data indicative of that included in such a Table-2 may be mined from and automatically stored responsively to chat requests in a database, which may be automatically queried to generate Table-2 for a registrant, for example.

By way of further, non-limiting example, Table-3 illustrates a chat request log that may be presented in an interactive electronic document, e.g., a web page, according to an embodiment of the present invention. Each row of the illustrated Table-3 is indicative of a different link/link location that is associated with a registrant. Each row includes an indicator of the date and time of a given record; the type of offer(s) with each record, namely, for example, what message, format and/or information is being used to generate requests for the chats; each users name; each users email address; the type of subscription associated with each user; the date and time of the last login for that given record; the number of requests for chat associated with the given offer for the given user; and the number of chats resulting from the foregoing. Table-3 additionally includes edit and delete items that can be used to change the preferences or other link settings or delete the link, respectively. Table-3 additionally includes options allowing the addition of new records, refreshing records and features permitting drilling down into the information contained within certain records within each row item. For example, there are buttons in the row just underneath the "Date," "Offer," and other items, such as the buttons in the "Offer" column ("_" in which search items may be inserted and the ¥ button which when activated instantiates further screens of information) that allow an administrator and/or registrant to review a specified offer "x," its content, format and/or other information that is desirous of being tracked and/or audited. Registrants, users and/or administrators may therefore be able to readily ascertain which "Offers" are performing best. Data indicative of that included in Table-3 may be mined from and automatically stored responsively to chat requests in a database, which may be automatically queried to generate Table-3 for a registrant, for example.

used to count the number of times the image has been loaded, such as by a web browser application. For example, a program may be executed at a server each time the image file is requested. In certain embodiments of the present invention, this information may be used in conjunction with that illustrated in Tables 1 and 2 to indicate a how effective the image and link are at generating actual chat requests, since the number of times an opportunity for a chat has been presented to potential requesters is known, and the number of actual that requests received is also known. This may further assist registrants to judge the relative effectiveness of different webpages as chat request sources for example. In certain embodiments of the present invention, Table-2 may be appended to include an indication in each row indicative of this number of times an image has been requested, and hence the number of times the indicated chat link has been presented for use to potential requesters as well. In certain embodiments of the present invention, Table-2 may be appended to include an indication of how effective a referral source is in generating quality leads, such as by considering a number of times an image has been requested, and hence the number of times the indicated chat link has been presented for use to potential requesters, as well as the number of chat requests that were actually received. Such an image may take the form of one or more pixels, for example.

The first version simply places an image at the current location and justifies any text to line up with the bottom of the image. The second version allows you to specify where you would like the text to be placed. The alignment option can be

TABLE 3

| +Add new record ≤<1 2 3 4 5 8 7 9 10 . . .>≥ | | | | | | | Refresh | |
|---|---|---|---|---|---|---|---|---|
| | | User | Page _ of xx Go | Page Size _ Change | | Item 1 of 25 of 999 | | |
| Date | Offer | Name | Email | Type | Last Login | Requests | Chats | |
| | _¥ | _¥ | _____¥ | _¥ | | | | |
| YYYY/MM/DD HH:MM | x | user1 | user1 email | Trial | YYYY/MM/DD HH:MM | 100 | 30 | Edit/ Delete |
| YYYY/MM/DD HH:MM | y | user2 | user2 email | Pro | YYYY/MM/DD HH:MM | 275 | 125 | Edit/ Delete |
| YYYY/MM/DD HH:MM | z | user3 | user3 email | Level N | YYYY/MM/DD HH:MM | 50 | 15 | Edit/ Delete |

In certain embodiments of the present invention, multiple rows that are indicative of and associated with a common link may be provided in Table-3. In such a case, each of the common link associated rows may be associated with a different electronic document (e.g., website), which referred the indicated hits. Again, data indicative of that included in such a Table-3 may be mined from and automatically stored responsively to chat requests in a database, which may be automatically queried to generate Table-3 for a registrant, for example.

In certain embodiments of the present invention, certain listings may expire. For example, advertisement listings on electronics classifieds websites may automatically expire after a given amount of time, e.g., 30, 60 or 90 days after listing. Certain embodiments of the present invention may be supplemented with an automatic relisting feature. For example, code that is operated at a server and automates re-listing of an advertisement with the included link may be provided to provide for link provision continuity. In such case, advertisement tracking may be automatically enhanced in duration as well.

In certain embodiments of the present invention, an image used in association with a link as discussed herein may be either "top" or "middle". By specifying a URL for the image, an executable program can be specified.

Referring still to FIG. 5, if a comparison at block 54 indicates the requested content is not associated with a registrant, or is otherwise not valid, a message may be served at block 55. In certain embodiments of the present invention, such as message may indicate no valid registrant is then associated with the requested link, or that a chat is not possible at this time. If such a comparison indicates the requested link is associated with a registrant, and is otherwise valid, processing may continue at block 57.

At block 57, the associated registrant's chat preferences may be determined. In certain embodiments of the present invention, processing at block 57 may include recovering one or more pieces of information entered or stored using process 20 (FIG. 1B). For example, processing at block 57 may include recovering SMS and/or e-mail preference information entered at blocks 23, 25 (FIG. 1B). Such information may indicate whether the associated registrant wishes to receive an SMS message indicating a link associated with him has been activated. Such information may indicate whether the associated registrant wishes to receive an e-mail message indicating a link associated with him/her has been activated.

At block 58, the preference(s) determined at block 57 may be enforced, such as by selectively sending either an SMS and/or an e-mail message indicative of the activated link dependently upon the determining at block 57. At block 59, preference enforcement at block 58 may be logged, such as in a database, for example.

Referring now to FIG. 6A, there is shown a block diagrammatic representation of a process 60 according to an embodiment of the present invention. In certain embodiments of the present invention, process 60 is well suited for use as at least part of process 58 (FIG. 5). Process 60 begins with determining whether a chat service with the associated registrant, or his designee or proxy for example, is available, at block 61. Processing at block 61 may include determining whether a "don't chat right now" or "no chat" preference has been selected by or on behalf of the associated registrant. Processing at block 61 may include examining one or more recovered preferences-related information entered using process 20 (FIG. 1B) (e.g., at block 29), for example. If processing at block 61 indicates a no chat preference has been selected, a no chat available message may be sent at block 62. The message sent at block 62 may be sent to a requester computing device that detected link activation at block 51 (FIG. 5), for example. At block 63, the message sent at block 62 may be received by such a requester computing device. At block 64, there received message may be presented to a requester, such as via a display, for example.

Alternatively, if processing at block 61 indicates a chat may be initiated preference has been selected (e.g., no no-chat preference has been selected), processing may continue with process 70 (FIG. 6B), for example.

Figure 6B:
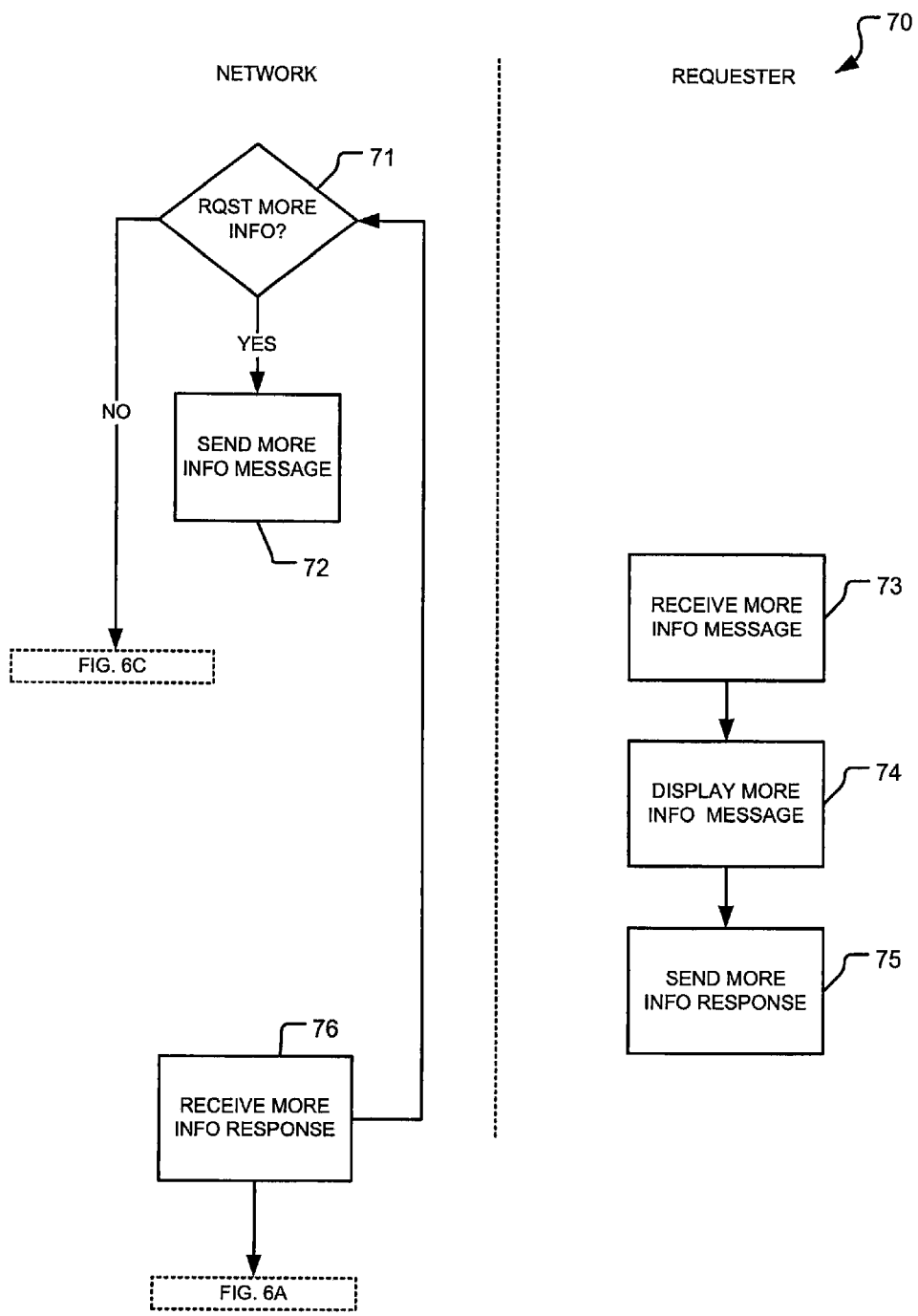
FIG. 6B illustrates a block diagrammatic representation of a process according to an embodiment of the present invention.
Figure 6C:
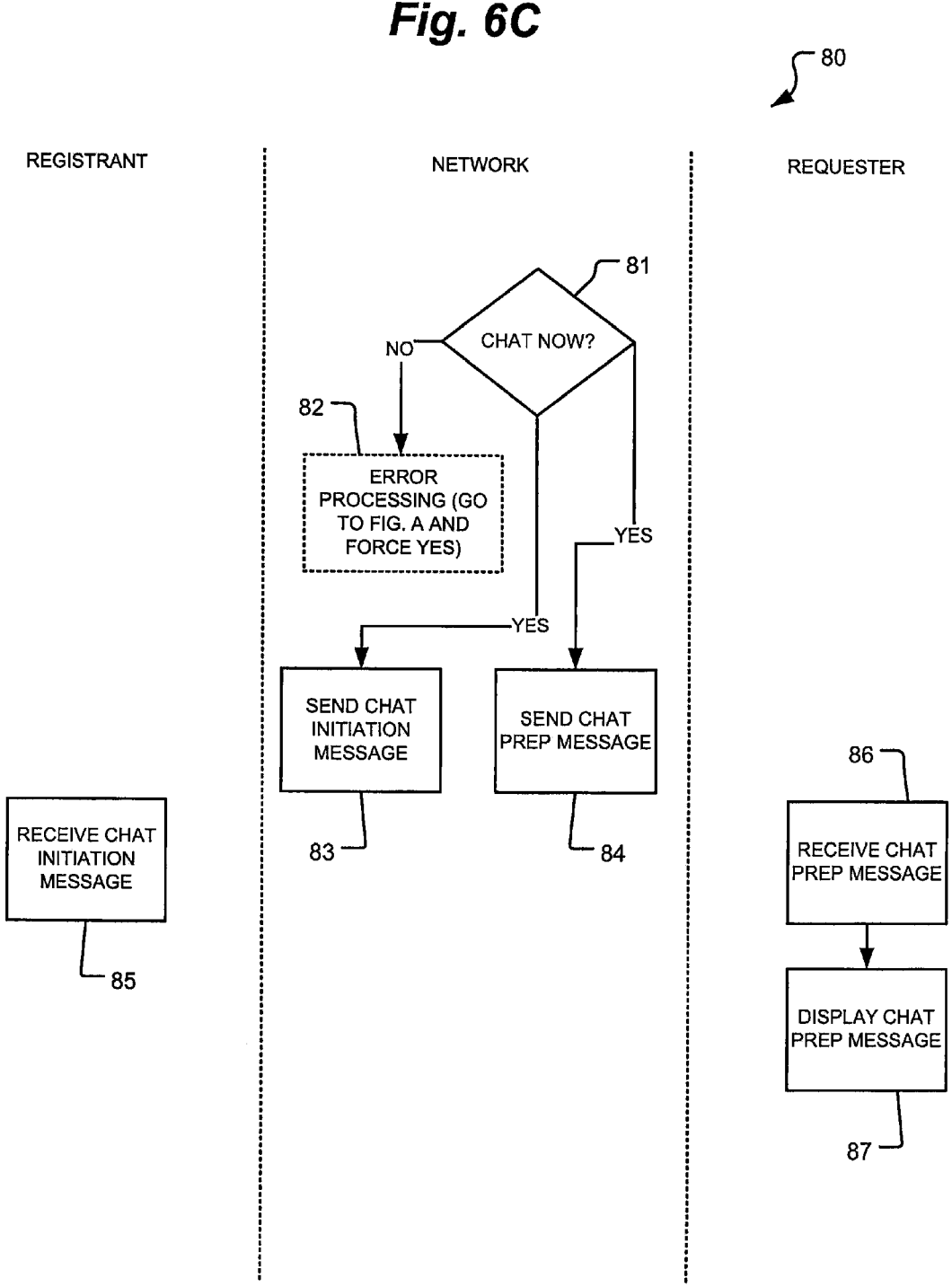
FIG. 6C illustrates a block diagrammatic representation of a process according to an embodiment of the present invention.

Referring now to FIG. 6B, there is shown a block diagrammatic representation of a process 70 according to an embodiment of the present invention. In certain embodiments of the present invention, process 70 is well suited for use as at least part of process 58 (FIG. 5). Process 70 begins with determining whether the associated registrant's preference is to request additional information at block 71. Processing at block 71 may include determining whether a "request more requester information" preference has been selected by or on behalf of the associated registrant. Processing at block 71 may include examining one or more recovered preferences-related information entered using process 20 (FIG. 1B) (e.g., at block 29), for example. If processing at block 71 indicates no more information should be requested, processing may proceed to process 80 (FIG. 6C). If processing at block 71 indicates more information should be requested, an information request message may be sent at block 72.

The message sent at block 72 may be to a requester's computing device that detected link activation at block 51. The message sent at block 72 may be received by such a computing device at block 73. The message received at block 73 may be presented to a requester at block 74, such as via display, for example. The requester may then enter the requested information and send it back to the originator of the block 72 request at block 75. Such a message is received at block 76. Processing then returns either to process 60 or block 71, for example.

Referring now to FIG. 6C, there is shown a block diagrammatic representation of a process 80 according to an embodiment of the present invention. In certain embodiments of the present invention, process 80 is well suited for use as at least part of process 58 (FIG. 5). Process 80 begins with determining whether the associated registrant wishes to enter into the requested chat with a requester. Processing at block 81 may include determining whether a "no chat now" or "away from computer" preference has been selected by or on behalf of the associated registrant. Should processing at block 81 indicate that no chat should commence, processing may return to block 62 (FIG. 6A).

Should processing at block 81 indicate a chat should commence, chat initiation messages may be sent at blocks 83, 84. The message sent at block 83 may be received at the associated registrant's computing device at block 85. The message sent at block 84 may be received at the requester's computing device at block 86. At block 87, the requester may be advised that a chat is being prepared and/or set up.

The message sent at block 83 may notify the associated registrant (as determined at block 54) that a chat is being requested and be in accordance with that registrant's preferences. For example, the registrant may have entered that they prefer SMS notifications at block 23 (FIG. 1B). In such an event, an SMS message may be sent with a chat link using the entered SMS preference information. Similarly, the registrant may have entered that they prefer e-mail notifications at block 25 (FIG. 1B). In such an event, an e-mail message may be sent with a chat link using the entered e-mail preference information.

In certain embodiments of the present invention, a chat link message may include a link, such as a URL that points to a website or invokes a web service. In certain embodiments of the present invention, a chat link message may include a substantially unique chat or session indicator, such as a Globally Unique Identifier (GUID). By way of non-limiting example, there may be a substantial number of GUIDs available, such as on the order of $2^{128}$, for use by the system. In certain embodiments of the present invention, vanity-type identifiers may be used.

In certain embodiments of the present invention, a chat link message may include a conventional-type URL indicative of a chat application, service or administration website. Such a URL may be appended with a unique identifier, as discussed above. Upon activation of the chat link message URL, a registrant may be logged into a secure website associated with the chat application. Such a secure website may include features, elements and/or pieces of content that are automatically updated from time-to-time by the system. In certain embodiments of the present invention, such features, elements and/or pieces of content may be indicative of whether a registrant is waiting for a chat session to commence.

In certain embodiments of the present invention there may be more than one type of chat link that may be sent at block 83 and received at block 85. For example, there may be different types of chat services corresponding to different computing capabilities or properties of registrants' computing devices. For example, there may be a first type of chat link indicative of and corresponding to a chat service that is tailored for computing devices having substantial display capabilities, such as computing devices having substantial display size or resolution, and resources like personal computers. Mother type of chat link that may be sent and received may be indicative of and correspond to a chat service that is tailored for computing devices having less display capabilities, such as computing devices having relatively limited display resources like smart phones. The capabilities may reflect display capabilities, and the amount of display real-estate available, for example.

By way of non-limiting, further explanation only, in certain embodiments of the present invention, one or more of the chat links may correspond to a chat application that is so-thin in design, that other computing capabilities needed, such as memory, processing, display space and/or browser application capabilities, for example, are minimized.

By way of non-limiting, further explanation only, in certain embodiments of the present invention, one or more of the chat links may correspond to a chat application that is still thin, but more computing resource intensive. Such an application may be well-suited for use with sophisticated, web-enabled devices, such as the Apple I-Phone and/or personal computers, for example. Such an application may provide for visual geographic indicators that are associated with chat requests. Such indications may be provided by a reverse-IP or DNS lookup of the chat requester, for example. Such an application may be provided with advertisement portions, for example. Such an application may monitor for chat requests, such as by proactively checking a database for entries indicative of pending chat requests. Such an application may, in certain embodiments, include a downloaded component, such as code, that may or may not be automatically launched at computing device or operating system start-up, for example. Such a component may automatically launch a browser window responsively to a new chat request being indentified, for example.

In certain embodiments of the present invention, the type of message sent at block 83 may be associated with the type(s) of link(s) sent at block 83. For example, an e-mail notification sent at block 83 may include one or both types of chat links, as it may typically be accessed using a variety of types of computing devices having various computing capabilities and resources, such as display size. In contrast, an SMS notification sent at block 83 may include only the reduced computing dependent types of chat links, as it may typically be accessed using computing devices having relatively limited display sizes.

Such an approach may advantageously provide for robust chat application provision that is operable in a greater variety of scenarios than conventional chat applications.

By way of further, non-limiting explanation, certain embodiments of the present invention may be particularly well-suited for use by/with amateur seller registrants or registrants having relatively limited computing and/or financial resources. Such registrants may not be able/willing to provide an amount of monitoring for chat services as may conventionally be required. For example, a listing agent for real estate or an e-commerce classifieds seller cannot/will not typically continuously monitor their office or home office personal computer for chat requests—resulting in missed sales opportunities, relative to a competitor that staffs or otherwise retains a conventional call center, for example. This may result is substantial commercial disadvantage.

Further, while such a registrant may be able to monitor electronic communications, such as e-mails, using a plurality of computing devices, such as personal computers and Internet enabled cell phones and PDAs, these devices have substantially different processing capabilities. Accordingly, if a conventional chat application is enhanced, so as to take advantage of the substantial resources available on a modern-day personal computer, the application may prove to be unwieldy, poor functioning or even incompatible with cellular phones or PDAs. On the other hand, if a conventional chat application is adapted to the lowest common denominator of capabilities, an enhanced experience that takes advantage of the substantial resources available on a modern-day personal computer is not available for a registrant. Accordingly, conventional chat applications may not be well suited for use by/with amateur seller registrants or registrants having relatively limited computing and/or financial resources.

In contrast, embodiments of the present invention provide for a selectively enhanced, chat-anywhere-type functionality, such that: (1) registrants do not need to continuously monitor for chat requests, and chat requests may be "pushed" to them or automatically "pulled" for them; and (2) chat application instantiations are adapted based upon the capabilities (or expected capabilities) of the registrant's computing device. For example, a relatively less-computing resource intensive, mobile-device-type adapted chat application may be provided for use with mobile devices. And, an enhanced, relatively more-computing resource intensive, personal computer-type device adapted chat application may be provided for use with such devices.

Differences between the chat application instantiations may include the frequency and type of additional content. A PC-type chat instantiation may include animated or video content, and additional resource information, such as graphic or other information. This other information may be associated with the chat instantiation or subject, for example. By way of further example, a Google® mapping corresponding to the IP address of the chat requester may be provided, for example. Such information may help a registrant determine whether or not to accept a communicated chat request, by letting him/her know the relative proximity of the requester to a location of interest, such as the location of an item or service for sale, for example. Additional information about other chats may also be provided, such as other chats by that client or other chats about the subject, for example. A mobile device-type chat instantiation may omit such additional information, effectively saving the limited display real-estate for the chat itself, for example.

In certain embodiments of the present invention such a selectively enhanced, chat-anywhere-type functionality may be provided using a plurality of links (e.g., as part of the message sent at block 83 in FIG. 6C). Each of the links may correspond to a different type of chat instantiation. The type of chat application instantiated may be based upon which link a registrant activates. For example, one link may be identified as a mobile device-type link, while another is identified as a PC device-type link. The mobile device-type one of the links may correspond to, and cause to be launched upon activation there of, a mobile device-type chat application instantiation. Similarly, the PC-type one of the links may correspond to, and cause to be launched upon activation there of, a PC-type chat application instantiation. Thus, enhanced chat services may be provided, while providing for mobile device adapted chat services.

Depending upon registrant preferences (e.g., whether e-mail or SMS chat notification is to be used), one or more of the links may be sent. For example, if SMS messaging is used, only the mobile device-type link may be sent. If e-mail messaging is to be used, one or more of the links may be provided. If the registrant has indicated that he doesn't wish to use mobile chat support, than only the PC-type link may be provided, for example.

In certain embodiments of the present invention, which type of chat application instantiation is launched may be automatically determined, such as based upon a type of computing device or computing device application which originated a response to a chat initiation message (e.g., the message sent at block 83 of FIG. 6). For example, a type of browser used to accept a chat request (e.g., by activating a provided link) may be automatically determined in a conventional manner, such as by serving an electronic document that can be used to gather information regarding the browser or computing device in a conventional manner. If the gathered information is indicative of a mobile-type device, a mobile device-type chat instantiation may be used. If the gathered information is indicative of a PC-type device, a PC device-type chat instantiation may be used.

In certain embodiments of the present invention, processing at block 81 may further include determining whether the registrant corresponding to the chat request being processed is logged on to a chat application, such as by being logged onto a chat associated server in a conventional manner. If the registrant is logged on, processing may continue at blocks 83 and 84, for example.

In certain embodiments of the present invention, if a chat has not commenced within a given amount of time after blocks 83, 84, an updated message to the chat requester may be provided at blocks 86, 87. Such a message may present the requester with an opportunity to cancel the chat request or continue waiting. If the requester opts to cancel the request, or otherwise falls to respond thereto, processing may cease. If the requester opts to continue waiting, a timer may be restarted for further analogous processing for example. Referring still to FIG. 6C, processing at blocks 86 and 87 may include periodically requesting an asynchronous or AJAX type update for an electronic document responsively, such as a responsively to a JAVA script-type timer application.

Referring still to FIG. 6C, processing at blocks 86 and 87 may include periodically requesting an asynchronous or AJAX type update for an electronic document responsively, such as a responsively to a JAVA script-type timer application.

Referring now to FIG. 7, there is shown a block diagrammatic representation of a process 90 according to an embodiment of the present invention. Process 90 begins with a registrant user deciding whether or not to accept a chat request at block 91. Processing at block 91 may include updating features, elements and/or pieces of content on the logged in, secure website indicating a registrant is waiting for a chat, along with one or more links that allow the registrant to accept or decline that chat. The secure website may correspond to the type of chat link sent at block 83, such that multiple website configurations may be used depending on the type of chat link received at block 85 and which was activated.

If processing at block 91, e.g., a registrant's interaction with the one or more links that allow the registrant to accept or decline that chat, indicates the registrant user does not wish to engage in the requested chat, processing may proceed to block 62 (FIG. 6A). If processing at block 91 indicates the registrant does wish to engage in the requested chat, a chat application 94 is commenced at blocks 92, 93. The chat occurrence is logged at block 95, such as in a database.

Chat application 94 commencement at block 92 may include automatically updating the logged into, and secure website viewed by a registrant (or a portion thereof) to include content indicative of chat exchanges (e.g., text and/or other content exchanged with the requester). Chat application 94 commencement at block 93 may include directing, or redirecting, the requester's computing device to an electronic document (e.g., web page) that includes a content portion indicative of chat exchanges (e.g., text exchanged with the chat accepting registrant).

Referring still to FIG. 6C, processing at blocks 92 and 94 may include periodically requesting an asynchronous or AJAX type update for an electronic document responsively, such as a responsively to a JAVA script-type timer application.

Figure 8A:
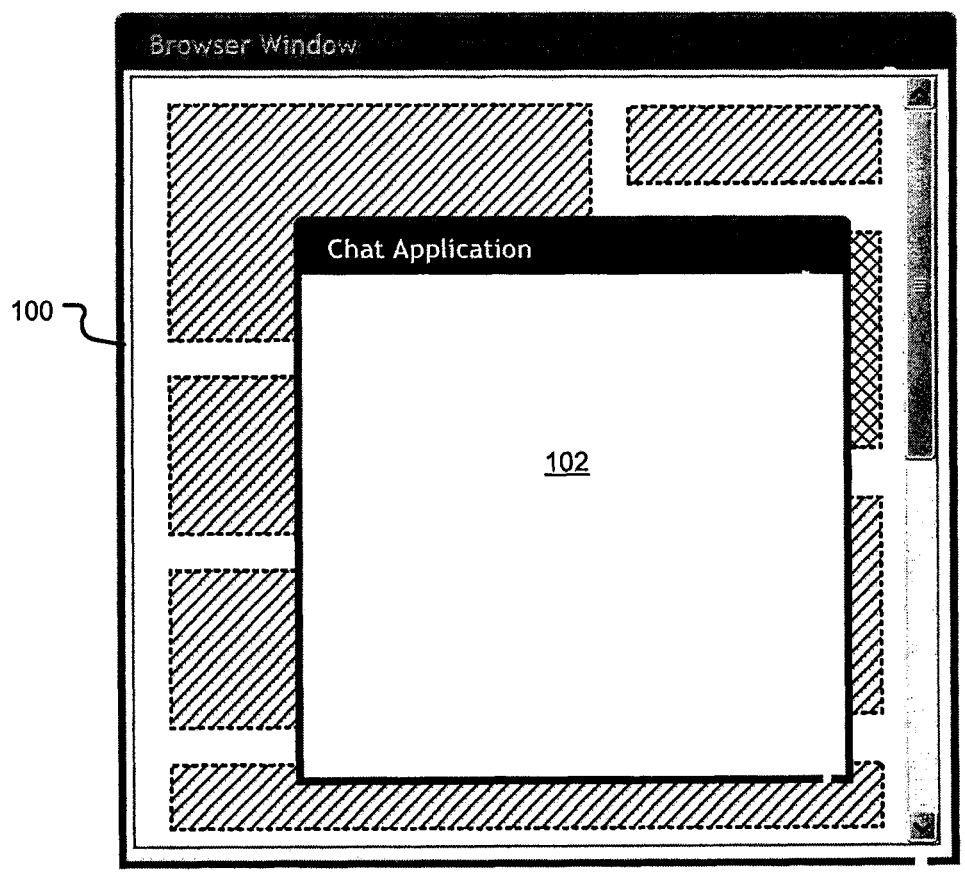
FIG. 8A illustrates an electronic document and chat instantiation according to an embodiment of the present invention.

Referring now to FIG. 8A, there is shown an electronic document 100 and chat application instantiation 102 for a requester's computing device according to an embodiment of the present invention. Chat application instantiation 102 may correspond to chat application 94 (FIG. 7). In the illustrated embodiment, instantiation 102 is in the form of a separate window from electronic document 100. In certain embodiments of the present invention, document 100 may take the form of any of documents 40 (FIGS. 4A and 4C), for example.

In certain embodiments of the present invention, document 100 may take the form of a framed document 40 (FIGS. 4A and 4C), for example. In certain embodiments of the present invention, received messages, such as those served at blocks 36, 55, 62, 72 and/or 84, and/or received at blocks 63, 73 or 86, for example, may be presented via a requester's computing device in another frame or window from an electronic document, such as document 40 or 100.

In certain embodiments of the present invention, the instantiation 102 window may be substantially identical in size, shape and/or content to electronic document 100 rather than substantially only a corresponding portion of the overall content presented therein. After a user is finished interacting with the instantiation 102 window, the display may be returned to electronic document 100. Such a configuration may advantageously have the chat appear more integrated to a requester than conventional chat applications, which may lead to greater acceptance and use thereof by potential requesters. In certain embodiments of the present invention the instantiation 102 window may take the form of the electronic document 100 window being framed and including the chat instantiation.

Figure 8B:
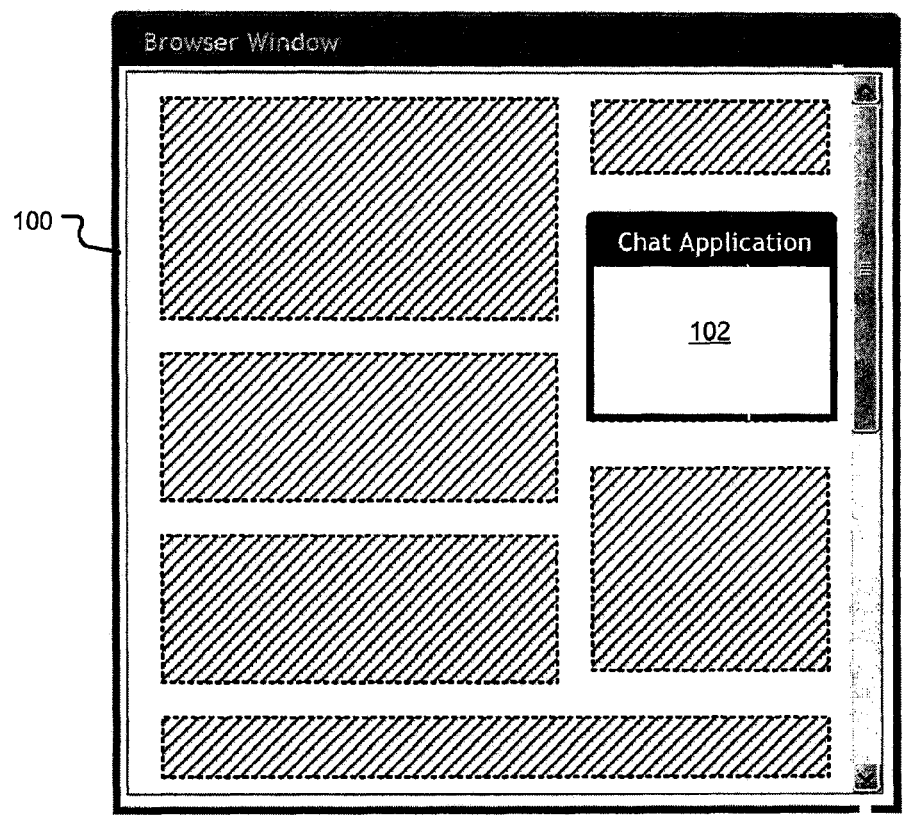
FIG. 8B illustrates an electronic document and chat instantiation according to an embodiment of the present invention.

Referring now to FIG. 8B, there is shown an electronic document 100 and chat application instantiation 102 for a requester's computing device according to an embodiment of the present invention. Chat application instantiation 102 may correspond to chat application 94 (FIG. 7). In the illustrated embodiment, instantiation 102 is in the form of a separate window from electronic document 100, which window is superimposed substantially only with the link associated content of document 100.

Figure 8C:
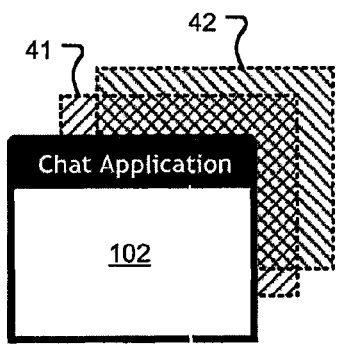
FIG. 8D illustrates a superimposed link and content and chat instantiation according to an embodiment of the present invention.

Referring now to FIG. 8C, there is shown a non-limiting example of a superimposition of chat application instantiation 102, content element 41 and a link 42 consistent with FIG. 8B. The embodiment of FIG. 8C illustrates a chat application instantiation 102 window, link 42 and content element 41 having analogous shapes and sizes as one another, although other configurations may be used. In the illustrated embodiment, instantiation 102 is in the form of a separate window from electronic document 100, which window is superimposed with and at least substantially the same size and shape as the link associated content of document 100. Such a configuration may advantageously allow the chat window to be better associated with the document 100 to a requester, possibly leading to greater acceptance and usage of chat applications by such users.

Figure 8D:
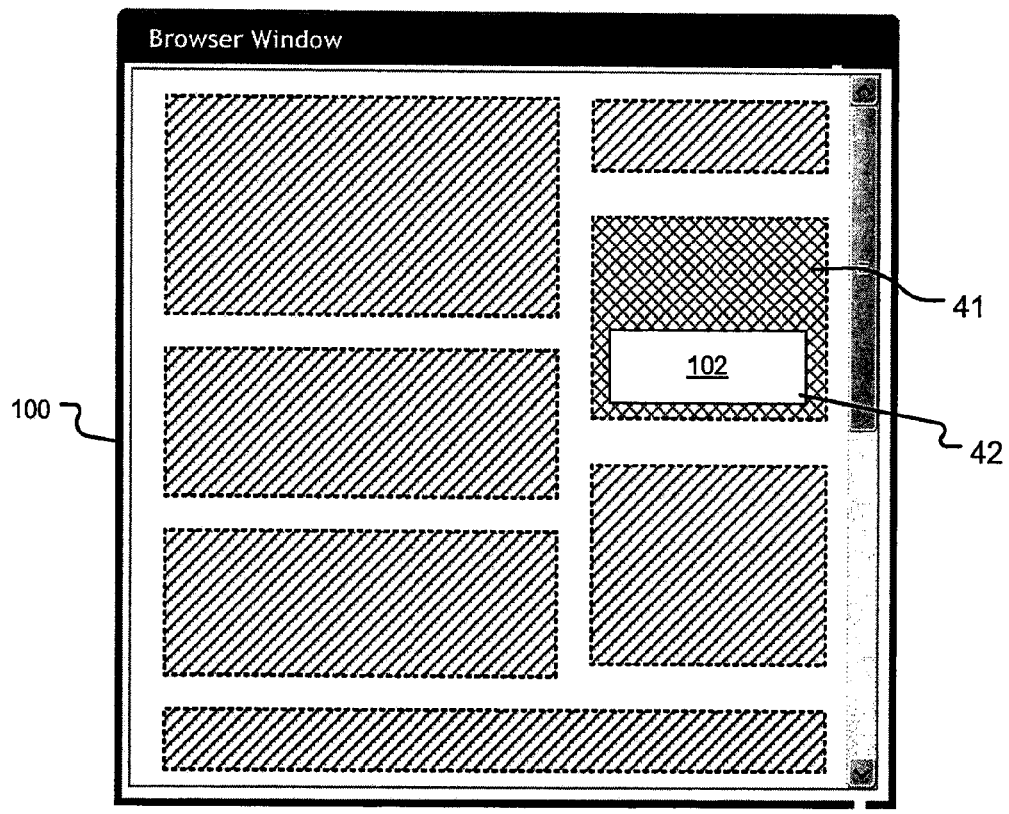

Referring now to FIG. 8D, there is shown an electronic document 100 and chat application instantiation 102 for a requester's computing device according to an embodiment of the present invention. Chat application instantiation 102 may correspond to chat application 94 (FIG. 7). In the illustrated embodiment of FIG. 8D, chat application instantiation 102 is in a same window as document 40, forming a portion thereof. In certain embodiments of the present invention, a portion of the link associated content may be replaced with the chat application presentation upon instantiation of a chat. By way of further non-limiting example, in certain embodiments of the present invention an embedded floating frame may be used in conjunction with Active Server Page Framework (ASPX) functionality to enable the chat application to be updated independently from at least one other portion and/or the remainder of document 100. In certain embodiments of the present invention, asynchronous postbacks may be used to enable the chat application to be updated independently from at least one other portion and/or the remainder of document 100. In certain embodiments of the present invention, an AJAX approach that uses asynchronous JavaScript and XML may be used to enable the chat application to be updated independently from at least one other portion and/or the remainder of document 100. Again, instantiation 102 is substantially only superimposed with link 42 associated content 41.

Figure 9:
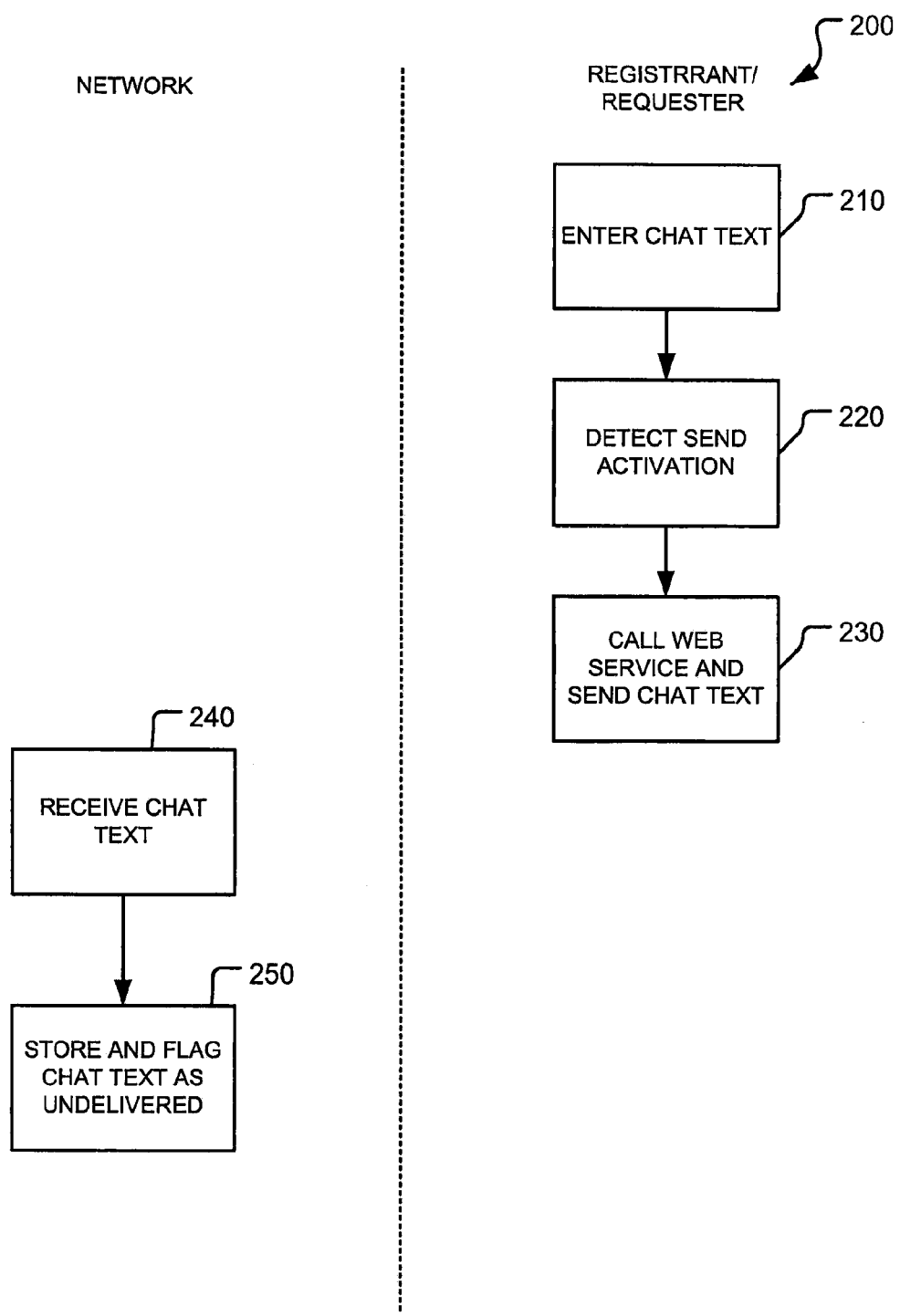
FIG. 9 illustrates a block diagrammatic representation of a process according to an embodiment of the present invention.

Referring now to FIG. 9, there is shown a block diagrammatic representation of a process 200 according to an embodiment of the present invention. In certain embodiments of the present invention, process 200 is well suited for use as at least part of chat application 94 commenced at blocks 92, 93 (FIG. 7).

At block 210, a first of the registrant/requester's computing device users enters text for the chat application using an electronic document or website. At block 220, a user activated "send" text link or object, such as a button, activation is detected. At block 230 a server or web service corresponding to the chat application 94 (FIG. 7) is called responsively to the detection at block 220. The server or web service may call one or more chat application 94 related procedures, for example. The server or web service procedures may receive the text entered at block 210 at block 240, responsively to it being sent at block 230. The server or web service procedures may store the text received at block 240 in a database, such as a Structured Query Language (SQL)-type database corresponding to the chat application 94 (FIG. 7). Additional information associated with the text stored at block 250, such as an associated chat session identifier, originating user, destination user and/or delivery status (e.g., delivered or undelivered) indicator may also be stored, such as in the SQL database.

Such a processing may allow for a stateless chat instantiation that includes a queue of unresolved communications, such as chat requests and chat messages. Such communications may be pushed, or pulled using asynchronous requests to resolve the communications.

Figure 10A:
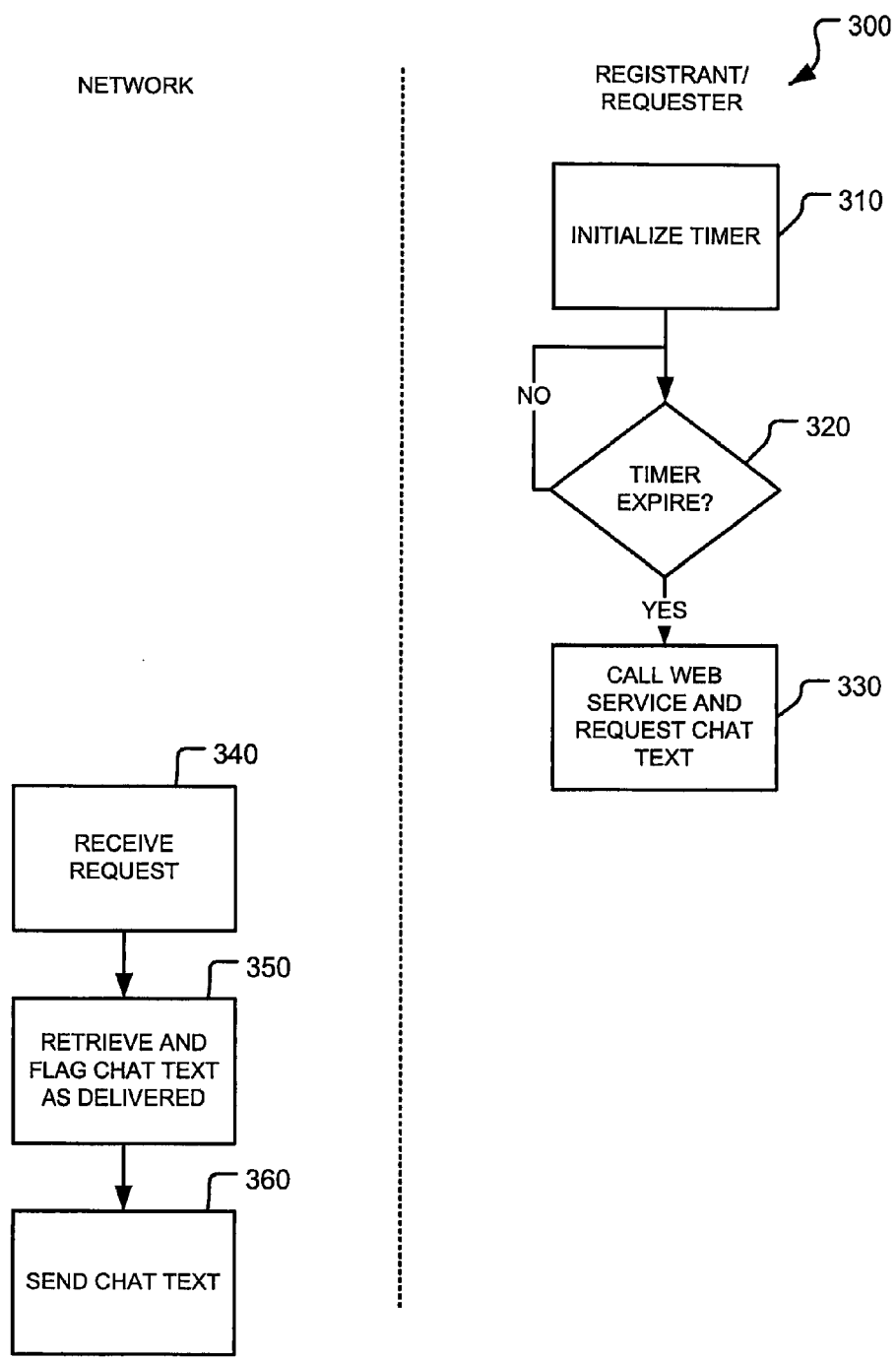
FIG. 10A illustrates a block diagrammatic representation of a process according to an embodiment of the present invention.
Figure 10B:
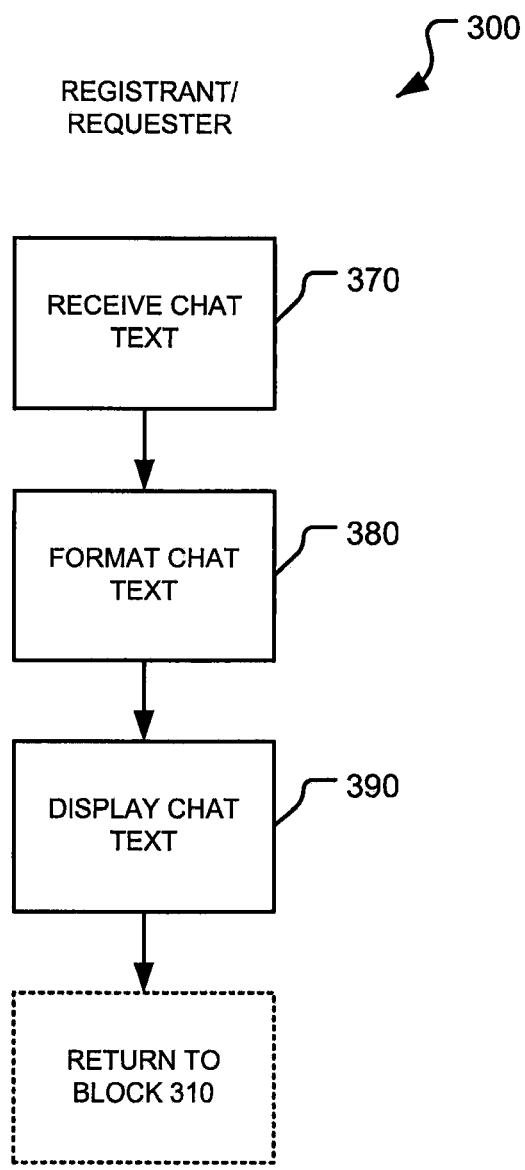
FIG. 10B illustrates a block diagrammatic representation of a process according to an embodiment of the present invention.

Referring now to FIGS. 10A and 10B, there is shown a block diagrammatic representation of a process 300 according to an embodiment of the present invention. In certain embodiments of the present invention, process 300 is well suited for use as at least part of chat application 94 commenced at blocks 92, 93 (FIG. 7).

Process 300 begins with a timer being initialized at block 310, such as by the chat application 94 (FIG. 7). When the timer is determined to have expired at block 320, a web service or other process may be called to check for undelivered chat information, such as that information stored in a SQL database, e.g., the database discussed with reference to FIG. 9. Again, the called service or process may correspond to the chat application 94 (FIG. 7). Also again, the service or process may call one or more chat application 94 related procedures, for example. The request sent at block 330 is received by or on behalf of the SQL database at block 340. The received request is processed by or on behalf of the SQL database, and undelivered messages for the requesting user are retrieved at block 350. At block 360, the retrieved text is sent to the requesting user (e.g., the user sending the request at block 330).

Referring now to FIG. 10B, the content sent at block 360 is received at block 370 (e.g., the requester or registrant sending the request at block 330). The received text is formatted for display by the electronic document (e.g., webpage or window) or website at block 380 and displayed at block 390. Processing then returns to block 310, such that the timer is again initialized.

In certain embodiments of the present invention, messaging exchange may not be peer-to-peer in nature. Rather, messages sent may be posted to a database, from which it is delivered to the intended recipient. The database stored messages may be pushed to or pulled by the recipient's computing device. Such a database may also advantageously serve as a repository for chat transcripts, for example.

Processing can continue in such a manner to provide bi-directional chat services between registrants and requesters.

In certain embodiments of the present invention, such a database may be used to additionally provide for such a chat session to be effected using bidirectional SMS messaging, for example. For example, analogous code may be used to provide chat messages to and pull chat messages from such a database, and translate them between an HTML compatible format suitable for use with the above-described methodology and text suitable for use with SMS messaging. Such code may receive chat messages from SMS device chat users via SMS messaging and store them in the database, and retrieve messages for SMS device chat users and deliver them via SMS messaging.

Figure 11:
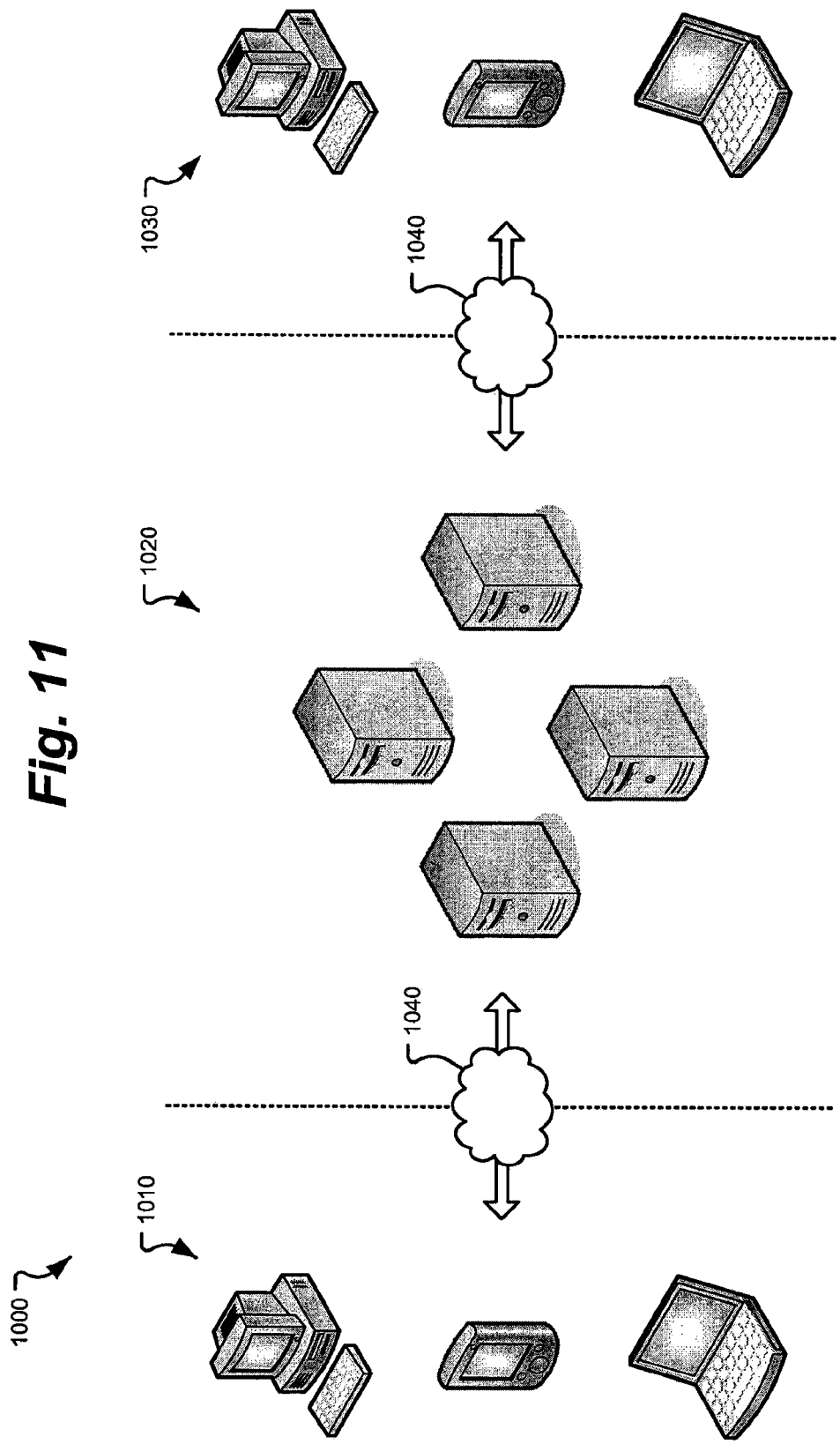
FIG. 11 illustrates a block diagrammatic representation of a system according to an embodiment of the present invention.

Referring now to FIG. 11, there is shown a configuration of a system 1000 according to an embodiment of the present invention. In certain embodiments of the present invention, system 1000 is well-suited for performing the functionality described herein.

System 1000 generally includes a first class of computing devices 1010, a second class of computing devices 1020 and a third class of computing devices 1030. In certain embodiments of the present invention, the groups need not be mutually exclusive. For example, one or more certain computing devices may be members of more that one of classes 1010, 1020 and/or 1030. Generally, each of the computing devices of classes 1010, 1020 and 1030 are communicatively interconnected with one another via at least one network, such as the Internet and wireline and wireless communications networks. In the illustrated embodiment of FIG. 11, the computing devices of class 1010 are interconnected with the computing devices of class 1020 and the computing devices of class 1030 via network connections 1040. In certain embodiments of the present invention, one or more of the computing device interconnections, such as connections 1040 by way of non-limiting example, may take the form of Internet or other data network connections.

In certain embodiments of the present invention, class 1010 computing devices may generally take the form of end-user computing devices, such as personal computers, terminals, personal digital assistants and/or cellular or telephones or smart phones, for example. In certain embodiments of the present invention, class 1010 computing devices may correspond to customer computing devices, such as those discussed in above, for example.

In certain embodiments of the present invention, class 1020 computing devices may generally take the form of servers, for example. In certain embodiments of the present invention, class 1020 computing devices may correspond to network or system servers, such as those discussed above, for example.

In certain embodiments of the present invention, class 1030 computing devices may generally take the form of end-user computing devices, such as personal computers, terminals, personal digital assistants and/or cellular telephones or smart phones, for example. In certain embodiments of the present invention, class 1030 computing devices may correspond to client computing devices, such as those discussed above, for example.

It will be apparent to those skilled in the art that modifications and variations may be made in the apparatus and process of the present invention without departing from the spirit or scope of the invention. It is intended that the present invention cover the modification and variations of this invention.

What is claimed is:

1. A computer program product being tangibly embodied in a non-transitory computer-readable medium and including computer-executable code for enhancing an electronic document including at least one link and being served via a network responsively to a request received via the network and correspondent to the electronic document, the computer program product computer-executable code comprising:

code for receiving a chat request via the network correspondent to activation of the at least one link included in the electronic document;

code for automatically identifying an identifier responsively to the received chat request;

code for automatically identifying at least one preference associated with the identified identifier;

code for automatically sending an SMS message including a mobile chat link indicative of the received chat request in a first mode, wherein the first mode corresponds to the at least one identified preference indicating an SMS messaging preference;

code for automatically sending an e-mail message including a personal computer chat link indicative of the received chat request in a second mode, wherein the second mode corresponds to the at least one identified preference indicating an e-mail messaging preference;

code for automatically sending both SMS and e-mail messages, the SMS message including the mobile chat link and the e-mail message including the personal computer chat link, each of the mobile chat and personal computer chat links being indicative of the received chat request, in a third mode, wherein the third mode corresponds to the at least one identified preference indicating both SMS and e-mail messaging preferences;

code for selectively automatically causing a mobile mode of a chat application corresponding to the received chat request to be instantiated responsively to receiving a request via the network correspondent to activation of the mobile mode link; and code for selectively automatically causing a personal computer mode of the chat application corresponding to the received chat request to be instantiated responsively to receiving a request via the network correspondent to activation of the personal computer mode link;

wherein the mobile mode instantiation of the chat application is adapted for use with a mobile device and is less computing resource intensive than the personal computer mode instantiation of the chat application, which is adapted for use with a personal computer.

2. The computer program product of claim 1, wherein the electronic document further includes a plurality of content portions, and the link corresponds to at least one of the content portions.

3. The computer program product of claim 2, further comprising code for Identifying an Identifier associated with the at least one of the content portions of the electronic document responsively to the correspondent request for or serving of the electronic document.

4. The computer program product of claim 3, further comprising code for serving the identified identifier contemporaneously with the electronic document, wherein the served identifier forms at feast a part of the at least one link.

5. The computer program product of claim 4, wherein the instantiated chat application is displayed with the electronic document such that the chat application visually corresponds with the at least one content portion of the served electronic document.

6. The computer program product of claim 1, further comprising code for causing the served electronic document to be framed responsively to receiving the request correspondent to activation of the mobile chat mode or personal computer mode link.

7. The computer program product of claim 1, wherein the electronic document is displayed in a first window, and the chat application is Instantiated in a second window.

8. The computer program product of claim 1, wherein the electronic document is displayed in a same window in which the chat application Is instantiated.

9. The computer program product of claim 4, further comprising code for selectively updating the chat application irrespective of the electronic document.

10. The computer program product of claim 1, wherein the chat request comprises a uniform resource locator having the identifier appended thereto.

11. A method for enhancing an electronic document including at least one link and being served via a network responsively to a request received via the network and correspondent to the electronic document, the method comprising:

by a processor of a computing device, receiving a chat request via the network corresponding to activation of the at least one link included in the electronic document;

automatically identifying an identifier responsively to the received chat request;

automatically identifying at least one preference associated with the identified identifier;

automatically sending an SMS message including a mobile chat link indicative of the received chat request in a first mode, wherein the first mode corresponds to the at least one identified preference indicating an SMS messaging preference;

automatically sending an e-mail message including a personal computer chat link indicative of the received chat request in a second mode, wherein the second mode corresponds to the at least one identified preference indicating an e-mail messaging preference;

automatically sending both SMS and e-mail messages, the SMS message including the mobile chat link and the e-mail message including the personal computer chat link, each of the mobile chat and personal computer chat links being indicative of the received chat request, in a third mode, wherein the third mode corresponds to the at least one identified preference indicating both SMS and e-mail messaging preferences;

selectively automatically causing a mobile mode of a chat application corresponding to the received chat request to be instantiated responsively to receiving a request via the network correspondent to activation of the mobile mode link; and selectively automatically causing a personal computer mode of the chat application corresponding to the received chat request to be instantiated responsively to receiving a request via the network correspondent to activation of the personal computer mode link;

wherein the mobile mode instantiation of the chat application is adapted for use with a mobile device and is less computing resource intensive than the personal computer mode instantiation of the chat application, which is adapted for use with a personal computer.

12. The computer program product of claim 11, wherein the electronic document further includes a plurality of content portions, and the link corresponds to at least one of the content portions.

13. The computer program product of claim 12, further comprising code for Identifying an Identifier associated with the at least one of the content portions of the electronic document responsively to the correspondent request for or serving of the electronic document.

14. The computer program product of claim 13, further comprising code for serving the identified identifier contemporaneously with the electronic document, wherein the served identifier forms at feast a part of the at least one link.

15. The computer program product of claim 14, wherein the instantiated chat application is displayed with the electronic document such that the chat application visually corresponds with the at least one content portion of the served electronic document.

16. The computer program product of claim 11, further comprising code for causing the served electronic document to be framed responsively to receiving the request correspondent to activation of the mobile chat mode or personal computer mode link.

17. The computer program product of claim 11, wherein the electronic document is displayed in a first window, and the chat application is Instantiated in a second window.

18. The computer program product of claim 11, wherein the electronic document is displayed in a same window in which the chat application Is instantiated and the chat request comprises a uniform resource locator having the identifier appended thereto.

19. The computer program product of claim 14, further comprising code for selectively updating the chat application irrespective of the electronic document.

20. A computing system comprising at least one computing device, the computing system comprising:
one or more hardware processors; and
memory comprising instructions executable by the one or more processors to cause the computing device to:
receive a chat request via the network corresponding to activation of the at least one link included in the electronic document;
automatically identify an identifier responsively to the received chat request;
automatically identify at least one preference associated with the identified identifier;
automatically send an SMS message including a mobile chat link indicative of the received chat request in a first mode, wherein the first mode corresponds to the at least one identified preference indicating an SMS messaging preference;
automatically send an e-mail message including a personal computer chat link indicative of the received chat request in a second mode, wherein the second mode corresponds to the at least one identified preference indicating an e-mail messaging preference;
automatically send both SMS and e-mail messages, the SMS message including the mobile chat link and the e-mail message including the personal computer chat link, each of the mobile chat and personal computer chat links being indicative of the received chat request, in a third mode, wherein the third mode corresponds to the at least one identified preference indicating both SMS and e-mail messaging preferences;
selectively automatically cause a mobile mode of a chat application corresponding to the received chat request to be instantiated responsively to receiving a request via the network correspondent to activation of the mobile mode link; and
selectively automatically cause a personal computer mode of the chat application corresponding to the received chat request to be instantiated responsively to receiving a request via the network correspondent to activation of the personal computer mode link;
wherein the mobile mode instantiation of the chat application is adapted for use with a mobile device and is less computing resource intensive than the personal computer mode instantiation of the chat application, which is adapted for use with a personal computer.

* * * * *